(12) United States Patent
Dow et al.

(10) Patent No.: US 8,863,488 B2
(45) Date of Patent: *Oct. 21, 2014

(54) WINDROW MERGING APPARATUS

(75) Inventors: Paul W. Dow, Byron, NY (US); Steven S. Dow, Byron, NY (US); Mark M. Woodruff, Bergen, NY (US)

(73) Assignee: Oxbo International Corporation, Byron, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,079

(22) Filed: Apr. 13, 2012

(65) Prior Publication Data

US 2012/0204529 A1     Aug. 16, 2012

Related U.S. Application Data

(63) Continuation of application No. 12/925,405, filed on Oct. 19, 2010, now Pat. No. 8,166,739, which is a continuation of application No. 11/388,692, filed on Mar. 24, 2006, now Pat. No. 7,827,774, which is a continuation of application No. 10/405,030, filed on Mar. 31, 2003, now Pat. No. 7,310,929.

(51) Int. Cl.
| | |
|---|---|
| *A01D 43/00* | (2006.01) |
| *A01B 73/02* | (2006.01) |
| *A01D 57/20* | (2006.01) |
| *A01D 84/00* | (2006.01) |

(52) U.S. Cl.
CPC ............... *A01D 84/00* (2013.01); *A01B 73/02* (2013.01); *A01D 57/20* (2013.01); *Y10S 56/21* (2013.01)
USPC .......................... 56/192; 56/228; 56/DIG. 21

(58) Field of Classification Search
USPC .......... 56/14.5, 15.8, 181–189, 192, 228, 364
See application file for complete search history.

(56) References Cited

U.S. PATENT DOCUMENTS

| | | |
|---|---|---|
| 1,877,519 A | 9/1932 | MacGregor |
| 1,877,770 A | 9/1932 | Larson |
| 2,168,266 A | 8/1939 | McElwain |
| 2,195,381 A | 3/1940 | Patterson |
| 2,343,583 A | 3/1944 | Rogers |
| 2,967,584 A | 1/1961 | Westerlund |
| 3,177,638 A | 4/1965 | Johnson |

(Continued)

FOREIGN PATENT DOCUMENTS

| | | |
|---|---|---|
| DE | G 90 14 438.4 | 3/1991 |
| DE | 43 28 351 A1 | 3/1995 |

(Continued)

OTHER PUBLICATIONS

"Snel schud-/harksysteem", 1 page (Jul. 21, 2000); with English translation, 2 pages.

(Continued)

*Primary Examiner* — Alicia Torres
(74) *Attorney, Agent, or Firm* — Merchant & Gould P.C.

(57) ABSTRACT

A windrow merger has a frame supporting first, second and third pickup assemblies, with the two outside pickup assemblies foldable between an extended use position and a retracted travel position. Each of the pickup assemblies includes a reversible conveyor providing multiple windrow merging configurations. The pickup assemblies are interchangeable and aligned to define an unobstructed pickup face.

11 Claims, 24 Drawing Sheets

(56) References Cited

U.S. PATENT DOCUMENTS

| | | | |
|---|---|---|---|
| 3,190,392 | A | 6/1965 | Ashton et al. |
| 3,214,002 | A | 10/1965 | Kirkpatrick et al. |
| 3,240,005 | A | 3/1966 | Rowse |
| 3,508,627 | A | 4/1970 | McCallum et al. |
| 3,515,408 | A | 6/1970 | Cagle |
| 3,650,096 | A | 3/1972 | Caldwell |
| 3,656,578 | A | 4/1972 | Hemken |
| 3,695,015 | A | 10/1972 | Twidale et al. |
| 3,709,360 | A | 1/1973 | Baker |
| 3,714,766 | A | 2/1973 | Ender et al. |
| 3,897,832 | A | 8/1975 | Leedahl et al. |
| 4,042,044 | A | 8/1977 | Honnold |
| 4,058,170 | A | 11/1977 | Ankenman et al. |
| 4,081,946 | A * | 4/1978 | Ehrhart ............ 56/14.4 |
| 4,131,293 | A | 12/1978 | Kindle |
| 4,184,314 | A | 1/1980 | Hobbs |
| 4,232,747 | A | 11/1980 | Pfenninger et al. |
| 4,245,716 | A | 1/1981 | Rayfield |
| 4,346,909 | A | 8/1982 | Hundeby |
| 4,409,780 | A | 10/1983 | Beougher et al. |
| 4,487,004 | A | 12/1984 | Kejr |
| 4,512,140 | A * | 4/1985 | Blakeslee ............ 56/11.6 |
| 4,573,309 | A * | 3/1986 | Patterson ............ 56/228 |
| 4,621,487 | A | 11/1986 | Urlacher |
| 4,658,572 | A | 4/1987 | Honey et al. |
| 4,738,092 | A | 4/1988 | Jennings |
| 4,768,334 | A | 9/1988 | Honey et al. |
| 4,793,129 | A | 12/1988 | Ehrhart et al. |
| 4,840,020 | A | 6/1989 | Oka |
| 4,896,732 | A | 1/1990 | Stark |
| 4,910,951 | A | 3/1990 | Reilly et al. |
| 4,981,013 | A | 1/1991 | Underwood |
| 5,031,394 | A | 7/1991 | Honey |
| 5,111,636 | A | 5/1992 | Quirin |
| 5,155,986 | A | 10/1992 | Kelderman |
| 5,177,944 | A | 1/1993 | Finlay |
| 5,203,154 | A | 4/1993 | Lesher et al. |
| 5,507,139 | A | 4/1996 | Delperdang et al. |
| 5,813,494 | A | 9/1998 | Ulschmid et al. |
| 5,893,262 | A | 4/1999 | Harbach |
| 5,911,625 | A | 6/1999 | von Allworden |
| 5,956,934 | A | 9/1999 | Wright et al. |
| 5,964,077 | A | 10/1999 | Guinn |
| 6,205,757 | B1 | 3/2001 | Dow et al. |
| 6,212,865 | B1 | 4/2001 | Peeters et al. |
| 6,347,686 | B1 | 2/2002 | Hedley et al. |
| 6,401,440 | B1 | 6/2002 | Franet et al. |
| 6,508,050 | B1 * | 1/2003 | Krone et al. ............ 56/192 |
| 6,658,828 | B2 | 12/2003 | Franet |
| 6,688,093 | B1 | 2/2004 | Franet et al. |
| 6,758,031 | B2 | 7/2004 | Franet et al. |
| 6,862,873 | B2 | 3/2005 | Franet |
| 6,942,041 | B1 | 9/2005 | Kraus et al. |
| 7,310,929 | B2 | 12/2007 | Dow et al. |
| 7,543,433 | B2 | 6/2009 | Hironimus |
| 7,650,736 | B1 | 1/2010 | Salley et al. |
| 7,712,295 | B2 | 5/2010 | Walter et al. |
| 7,827,774 | B2 | 11/2010 | Dow et al. |
| 8,074,432 | B2 | 12/2011 | Hironimus et al. |
| 8,091,331 | B2 | 1/2012 | Dow et al. |
| 8,166,739 | B2 * | 5/2012 | Dow et al. ............ 56/192 |
| 8,186,138 | B2 | 5/2012 | Dow et al. |
| 8,225,588 | B2 | 7/2012 | Hironimus et al. |
| 8,511,052 | B2 | 8/2013 | Dow et al. |
| 2005/0126153 | A1 | 6/2005 | Hironimus et al. |
| 2005/0172598 | A1 | 8/2005 | Billard |
| 2006/0162308 | A1 | 7/2006 | Dow et al. |
| 2006/0248870 | A1 | 11/2006 | Geiser |
| 2006/0254238 | A1 | 11/2006 | Walter et al. |
| 2006/0254240 | A1 | 11/2006 | Krone et al. |
| 2006/0254244 | A1 | 11/2006 | Geiser |
| 2009/0241503 | A1 | 10/2009 | Babler et al. |
| 2009/0320434 | A1 | 12/2009 | Pourchet et al. |
| 2010/0037584 | A1 | 2/2010 | Dow et al. |

FOREIGN PATENT DOCUMENTS

| | | |
|---|---|---|
| DE | 43 41 610 | 8/1995 |
| DE | 10 2006 059797 | 6/2008 |
| EP | 0 827 684 A2 | 3/1998 |
| EP | 0 853 872 | 3/2003 |
| FR | 2 663 189 A1 | 12/1991 |
| GB | 2 194 422 A | 3/1998 |
| SU | 835359 | 6/1981 |
| WO | WO 87/06793 | 11/1987 |

OTHER PUBLICATIONS

International Search Report and Written Opinion mailed Aug. 24, 2012.

European Search Report dated Apr. 11, 2014.

* cited by examiner

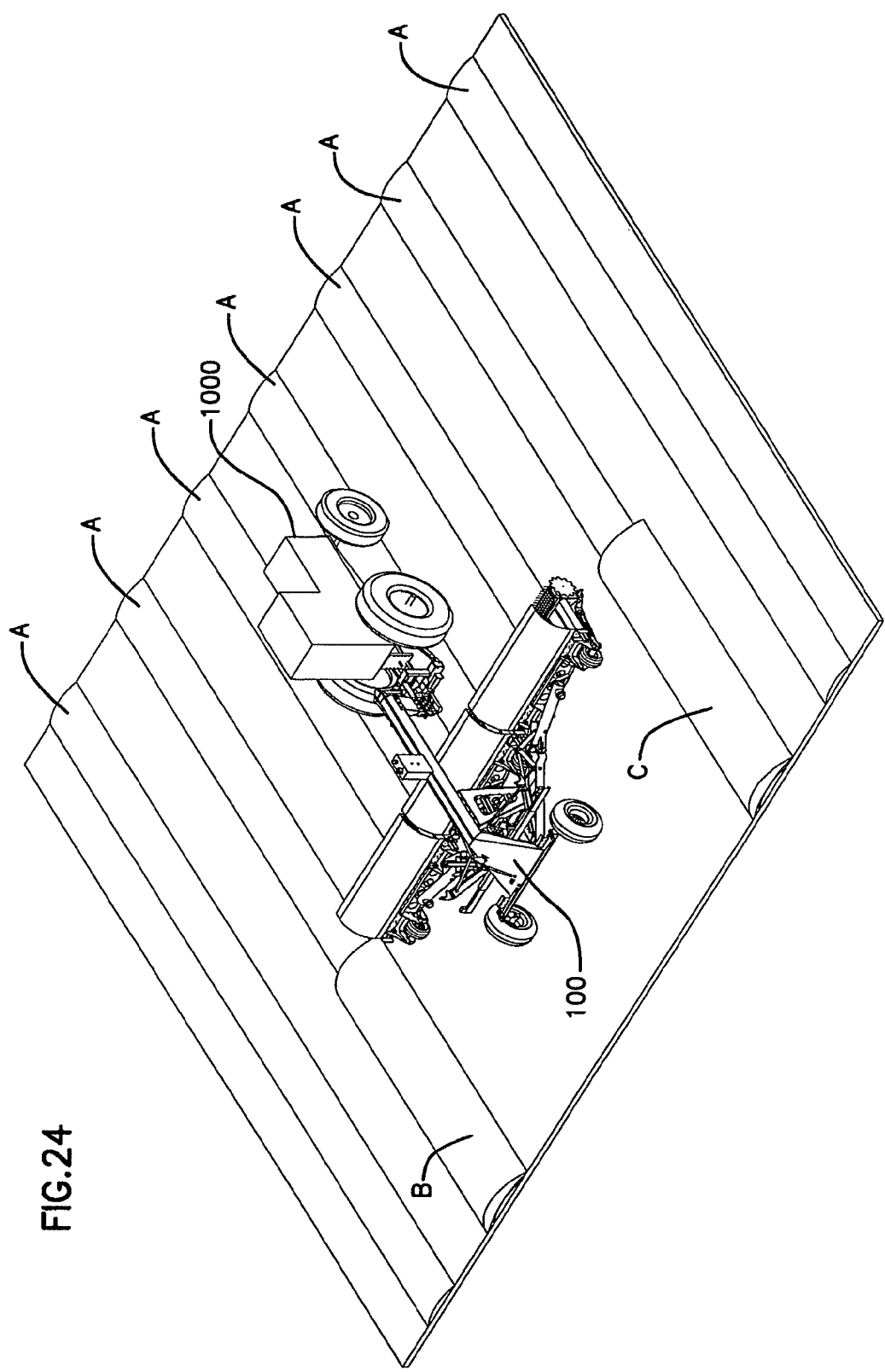

WINDROW MERGING APPARATUS

CROSS-REFERENCE TO RELATED APPLICATIONS

This application is a Continuation of application Ser. No. 12/925,405 filed Oct. 19, 2010, which is a Continuation of application Ser. No. 11/388,692, filed Mar. 24, 2006, issued as U.S. Pat. No. 7,827,774; which is a Continuation of application Ser. No. 10/405,030, filed Mar. 31, 2003, issued as U.S. Pat. No. 7,310,929; which applications are incorporated herein by reference.

BACKGROUND OF THE INVENTION

1. Field of the Invention

The present invention relates to a windrow merger apparatus and a method of merging windrows. In particular, the present invention relates to a windrow merging apparatus and method having more than two heads and conveyor assemblies.

2. Description of the Prior Art

Devices for merging windrows are well known and are used to gather material, such as cut hay that might be windrowed, and merge it into a single windrow for harvesting or baling. Such windrow mergers have typically included a single pickup head and are either self propelled or pulled behind a tractor to move the material to a single row at one side of the merger. When used on a relatively small scale, these devices generally function in a satisfactory manner. However, for large scale operations requiring merging on large fields, the capacity of such mergers is limited because of their width and may not be sufficient to merge the material at an adequate rate for subsequent pickup by other devices. The merging must often be performed during a small timeframe when conditions are favorable. A limiting factor for the size of the merger device has been the towing capacity of tractors and other propulsion devices. However as larger, more powerful tractors are utilized, larger equipment may be used. The larger tractors have led to larger harvesting machinery so that the need exists for a merger with greater merging rates so as not to slow the harvest process.

Although more power may be available to propel merger devices, other limitations are encountered that have restricted the size of windrow mergers. The machines must be transported from field to field and able to accomplish entry and exit in and out of fields, as well as meeting width limitations for transport on public highways and other roads without removing the heads.

In order to achieve a wider merger apparatus, folding mergers have been developed, such as shown in U.S. Pat. No. 6,205,757 to Dow et al. The Dow et al. '757 patent has a two headed merger device that folds to a storage position for transport. In addition, the Dow device utilizes transverse conveyors to move materially laterally and provide various configurations for moving material to the desired windrow. The Dow et al. '757 patent teaches a device that is successful in providing higher capacity, greater width, and improved methods of merging while folding to a storage position for transport. However, further improvements to windrow mergers are possible.

Utilizing wider folding heads provides design challenges, especially achieving a linkage for folding wide heads and providing acceptable support, while limiting the loads and torque in operating positions, storage positions and during movement between the use position and the transport position. In order to achieve higher capacity, the heads may be widened, but the design becomes more complicated and difficult due to moving wider heads and staying within height and width limitations when folded. Controls and mechanisms for a folding more than two heads are not contemplated in the prior art.

Moreover, another problem that devices having multiple heads suffer from is that they typically form a gap between the ends of adjacent pickup heads so that some material may be missed in the field as the merger advances. Motors and other drive equipment have typically been positioned at ends of heads, providing an obstruction between the ends of the heads, requiring a gap between the end row of tines adjacent the heads. Operating prior adjustable conveyors at a sufficient rate so that material is passed from one conveyor to the other has required spacing that allows for adjustment, which prohibits an unobstructed pickup face without gaps. Achieving a conveyor that does not require adjustable end rollers would improve the liability and eliminate constant adjustment for different configurations. If such manual adjustment is not required, control of the merger apparatus and changing between different operating configurations, or changing between storage and use positions could be accomplished remotely by an operator of the towing vehicle without having to manually adjust conveyor heads and other equipment. The utility of such a merger apparatus is increased if such changes and configurations may be made remotely during merging without having to stop.

It can be seen that a new and improved windrow merging apparatus is needed. Such a merger should provide for a wider effective pickup face that can accommodate various spacing of windrows and material and an unobstructed pickup face so that material is not missed in the field. Such a merger apparatus should provide for a merger having more than two heads and allow for folding of the heads between a use position and a storage position, providing for transport on public roads. A merger having conveyors with fixed heads that do not require adjustment increases the reliability and efficiency of such a merger. The present invention addresses these as well as other problems associated with windrow merging devices and merging operations.

SUMMARY OF THE INVENTION

The present invention is directed to a windrow merger apparatus, such as is commonly used to merge cut hay and/or windrows into larger windrows for harvesting or baling. The windrow merger apparatus is configured for being towed by a tractor or other vehicle, or may be self-propelled. The merger includes a frame and three pickup and transfer assemblies in a preferred embodiment. Each of the pickup and transfer assemblies includes a pickup head and an associated conveyor. The pickup heads have sets of tines that extend radially outward from the head spaced along the length of the head, transverse to the direction of travel. The tines rotate and pick the hay or other material up and send it rearward to an associated conveyor for moving to a single windrow. The heads include removable guards intermediate the sets of tines. Motors and related equipment are recessed so that the heads are closely aligned with the tines having an unobstructed face to the hay or other material as the merger travels. Star wheels having a ratcheted outer periphery configured for engaging material on the ground and rotating to aid in picking up the material may be disposed intermediate ends of adjacent pickup heads so that an unobstructed and continuous pickup face is achieved. In one embodiment, the pickup heads also include skid assemblies that support the heads and ride over the ground. The skid assemblies are positioned to the rear of the heads so as not to interrupt the continuity of the face of the tines as the merger apparatus travels.

In one embodiment, the pickup heads are placed under a preloaded torque to position the heads slightly lower than without the torque and are spring loaded as the pickup heads travel and engage the uneven terrain. In this manner, the heads more easily "float" over the uneven ground.

The merger has a linkage that is hydraulically driven in a preferred embodiment that folds the outer pickup and transfer assemblies rearward and inward. The center pickup and transfer assembly can be moved upward and downward in a pivoting type motion. When the pickup and transfer assemblies are raised, each outer assembly rests on supports in its raised and folded position. The folding systems are driven by hydraulic cylinders and provide for folding and unfolding even while the merger apparatus is moving and operating.

Each of the pickup and transfer assemblies includes a conveyor assembly associated with each pickup head. Shrouds extend in an arcing configuration at the rear of the conveyors over the top to direct material flung from the heads onto the conveyors. The conveyors are driven by hydraulic motors in a preferred embodiment and are operable in either direction so that multiple merging configurations and operations are possible. The merging arrangement selected is varied by adjusting both the configuration of the pickup and transfer assemblies and the direction of the conveyors.

In a preferred embodiment, the conveyors include pulleys or rollers that are formed with blades radially disposed around a periphery of the pulley and engaging the conveyor belt. The pulleys do not have a through axle and the blades chop up material that falls off of the conveyor. Such a configuration also helps to avoid clogging, which may occur with material engaging through axles and other moving parts. Such pulleys also reduce the weight of the machine when compared to conventional pulleys.

Controls for the merger can be remotely actuated from the cab if the merger is self propelled, or from the cab of the tractor or other propulsion device. Since hydraulic motors drive the various systems on the merger, central hydraulic controls provide for simple, reliable remote actuation that can be accomplished from the cab of a towing vehicle while the merger operates and continues to travel. The tractor and the merger may simultaneously be operated from a single location by one person with such a control arrangement.

These features of novelty and various other advantages that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

Referring to the drawings wherein like reference numerals and letters indicate corresponding elements throughout the several views:

FIGS. 22-24 are diagrammatic views of patterns of merger methods according to the principles of the present invention.

DETAILED DESCRIPTION

Figure 1:
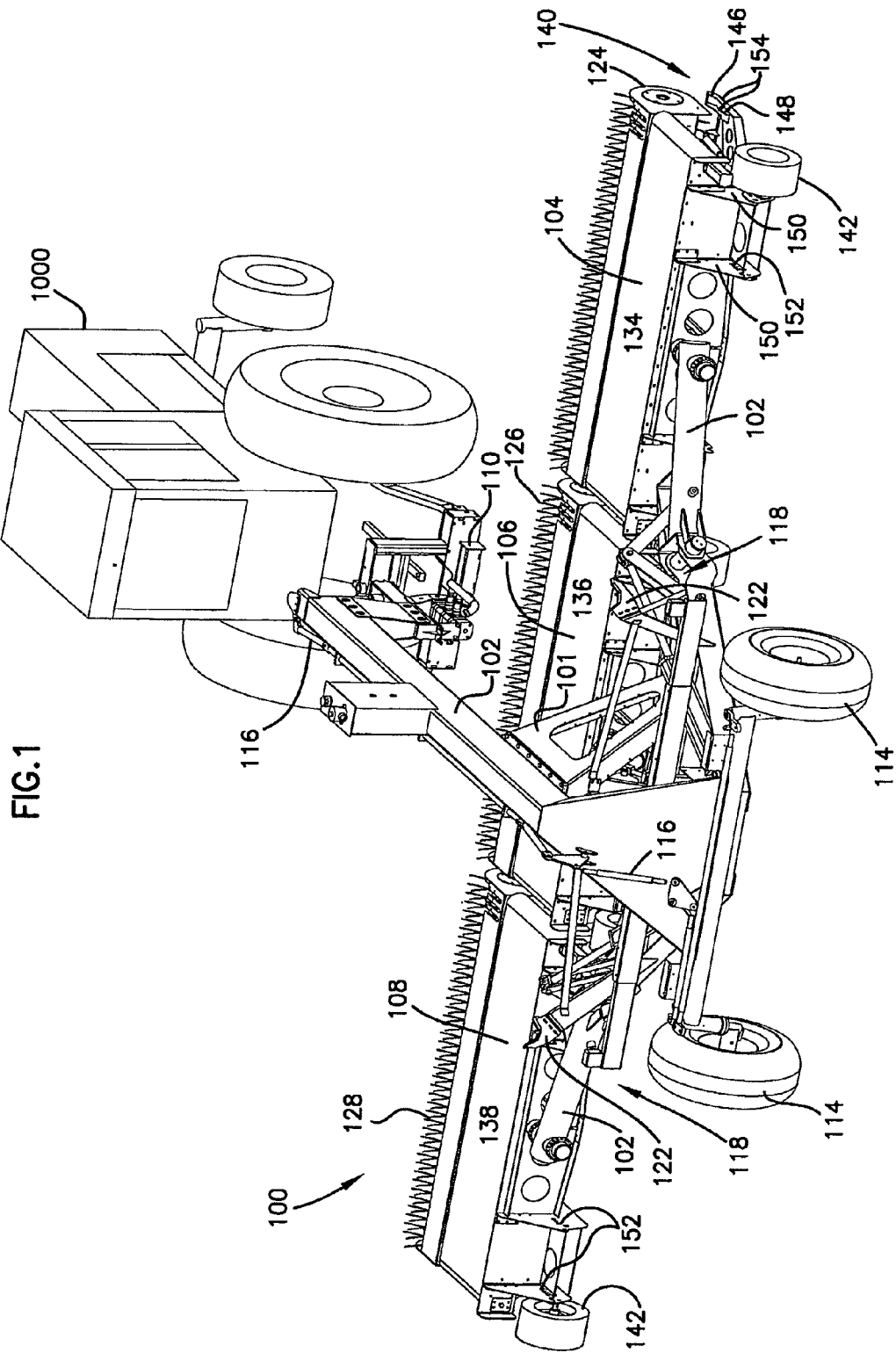
FIG. 1 is a perspective view of a merger apparatus according to the principles of the present invention in a use position with conveyor shrouds removed for clarity.
Figure 2:
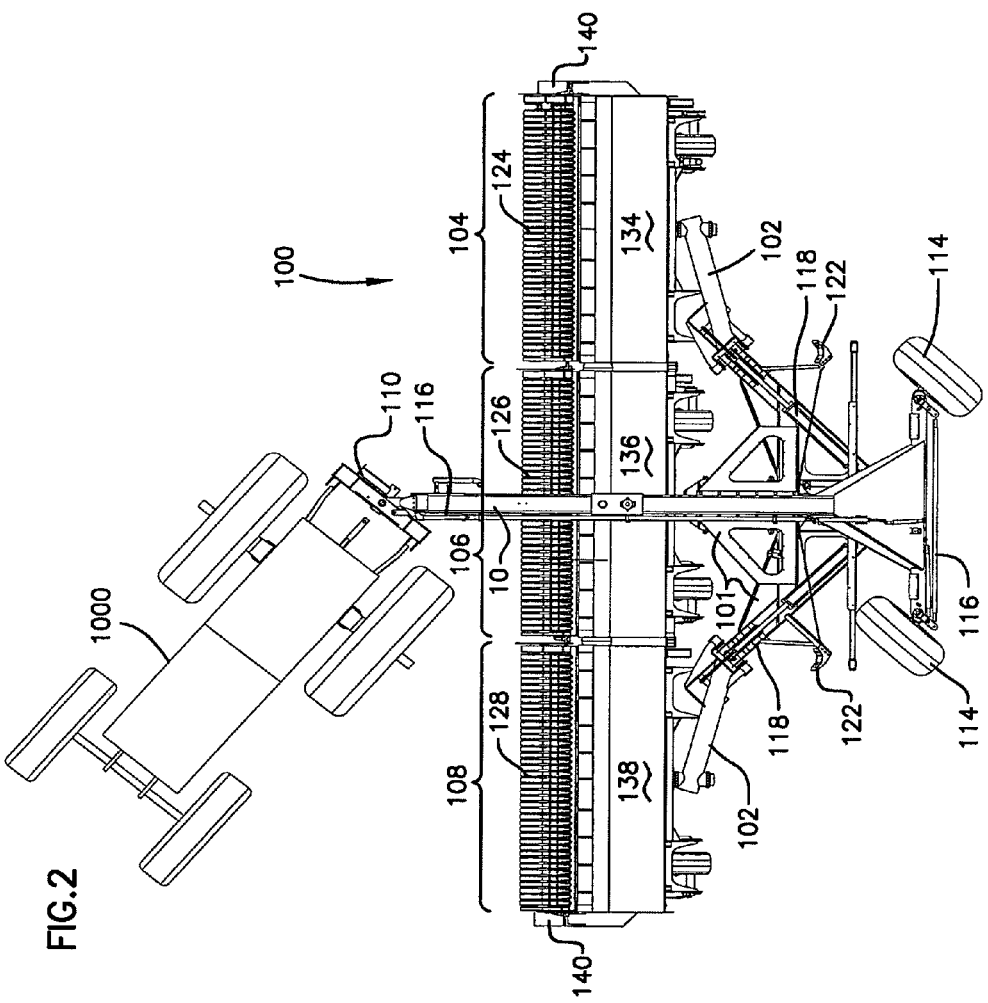
FIG. 2 is a top plan view of the merger shown in FIG. 1 in the use position.
Figure 3:
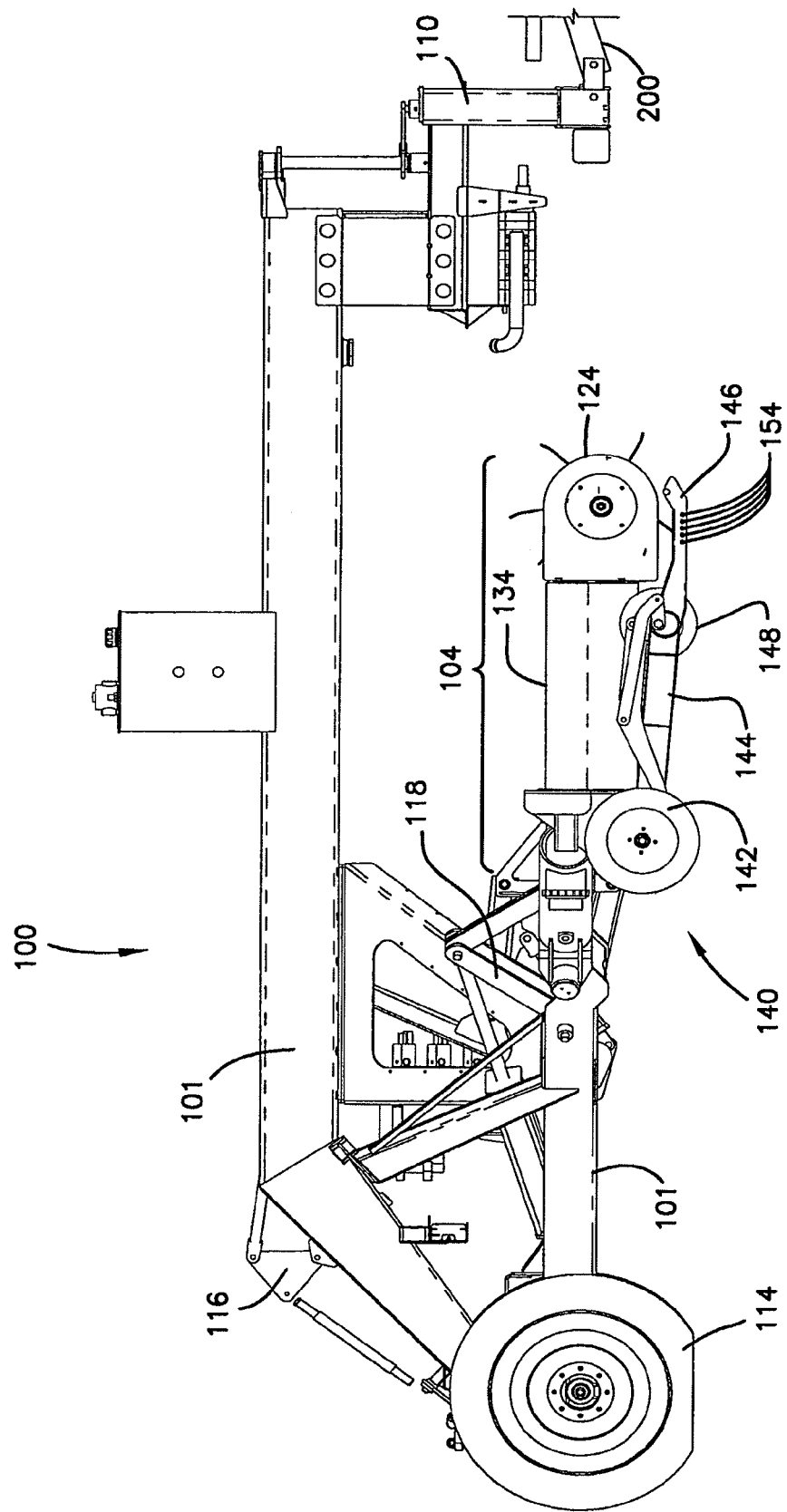
FIG. 3 is a side elevational view of the merger shown in FIG. 1 in the use position.

Referring now to the drawings, and in particular to FIG. 1, there is shown a merger apparatus, generally designated 100. A towing device, generally a tractor 1000 tows the merger apparatus 100. In other configurations, the merger apparatus 100 may be self propelled, such as is well known to those skilled in the art and the principles of the present invention apply to towed and self-propelled devices.

As shown generally in FIGS. 1-4, the merger includes three pickup and transfer assemblies, designated 104, 106 and 108. The assemblies 104, 106 and 108 are supported on a framework 101 including folding arms 102 that provides for movement of the outer assemblies 104 and 108 between a use position and a folded position, as explained hereinafter. The merger apparatus 100 includes steerable rear wheels 114 and a hitch 110 for mounting to the tractor 1000. A steering linkage 116, such as is well known in the art, connects the towing vehicle 1000 to the rear wheels 114 to improve tracking so that the merger apparatus 100 substantially follows directly behind the towing vehicle 1000. A power take off typically provides the power to the merger apparatus 100 from the towing vehicle 1000. In addition, the controls are mounted in the cab of the towing vehicle 1000, as explained hereinafter, so that an operator may control all merger functions without having to stop the merging operation and make manual adjustments to the merger 100.

Figure 4:
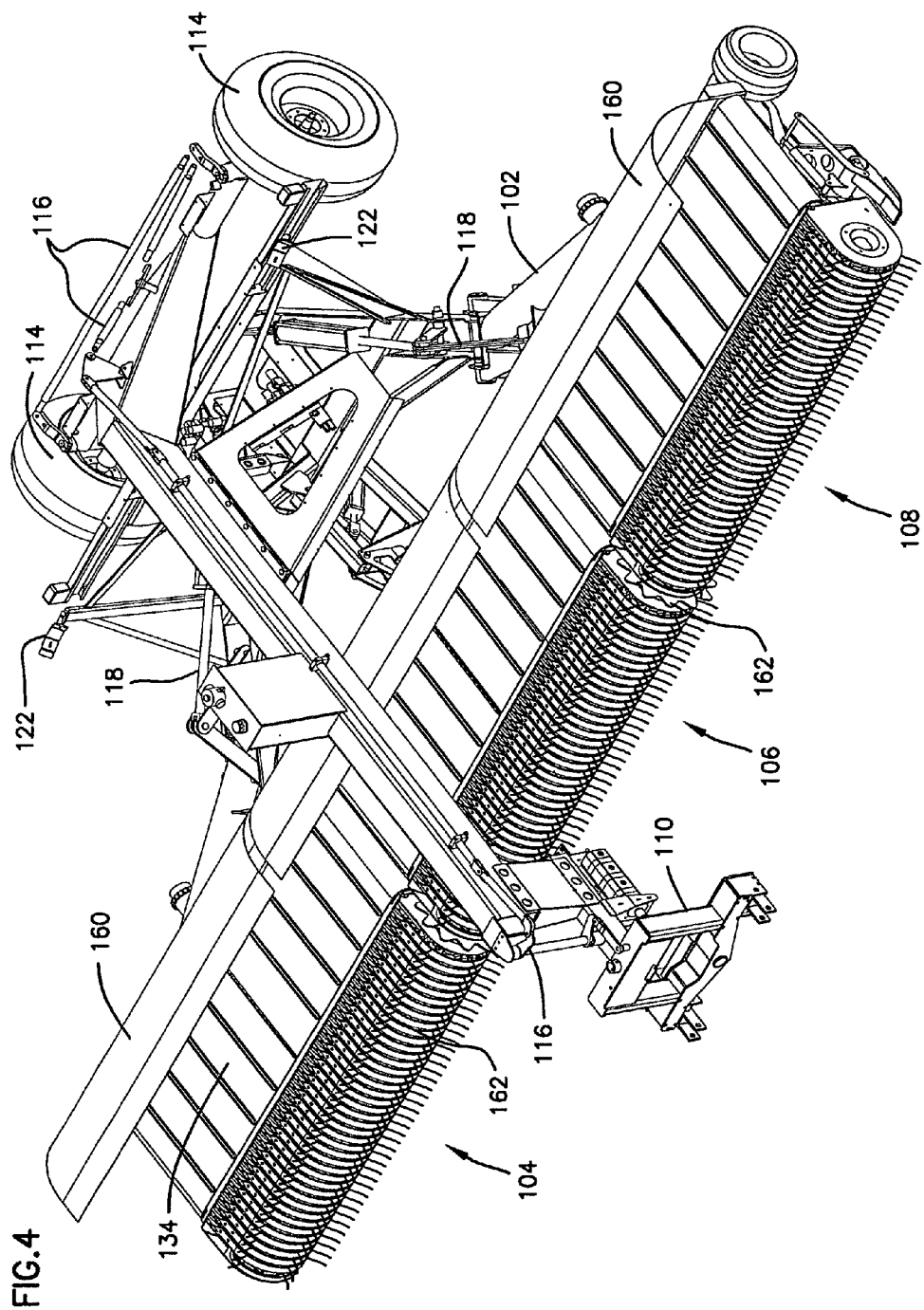
FIG. 4 is a front perspective view of the merger shown in FIG. 1 in the use position.
Figure 15:
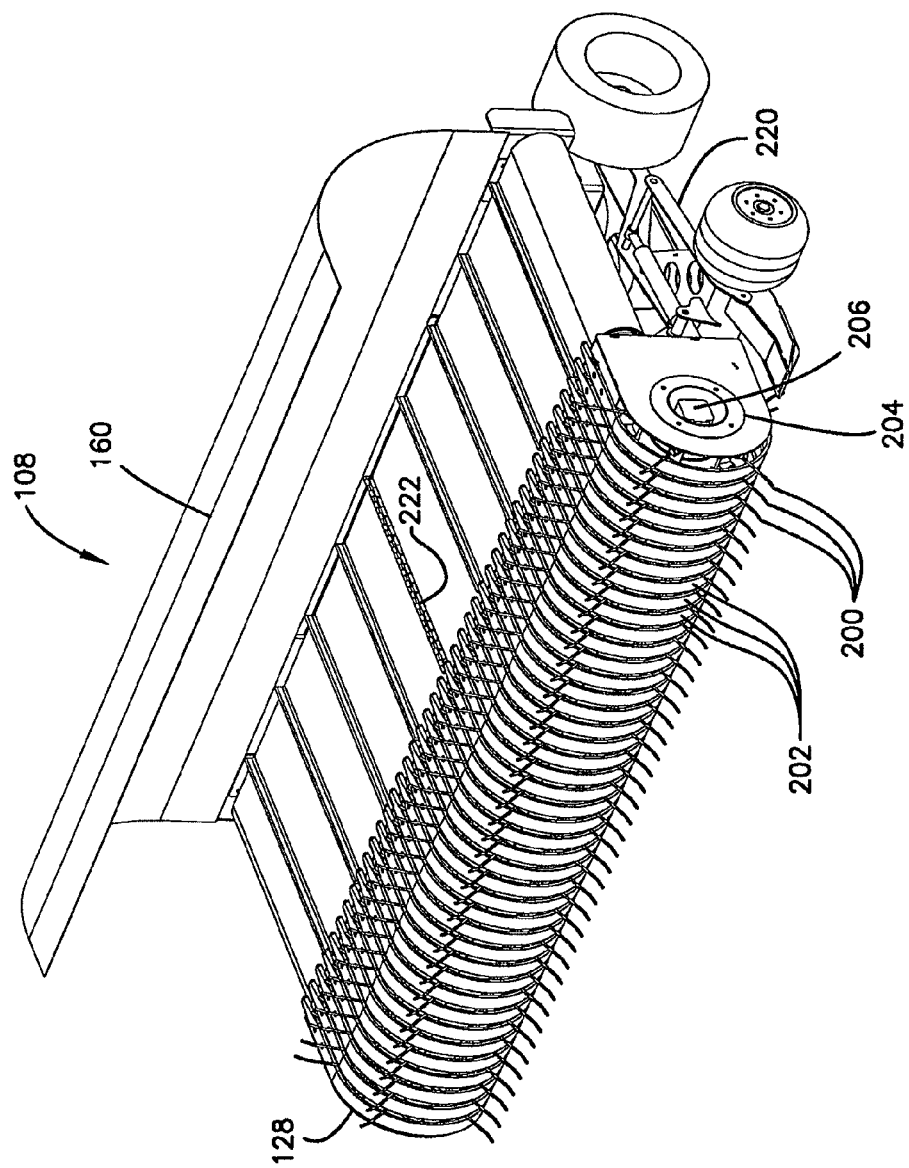
FIG. 15 is a perspective view of a head assembly according to the principles of the present invention.
Figure 16:
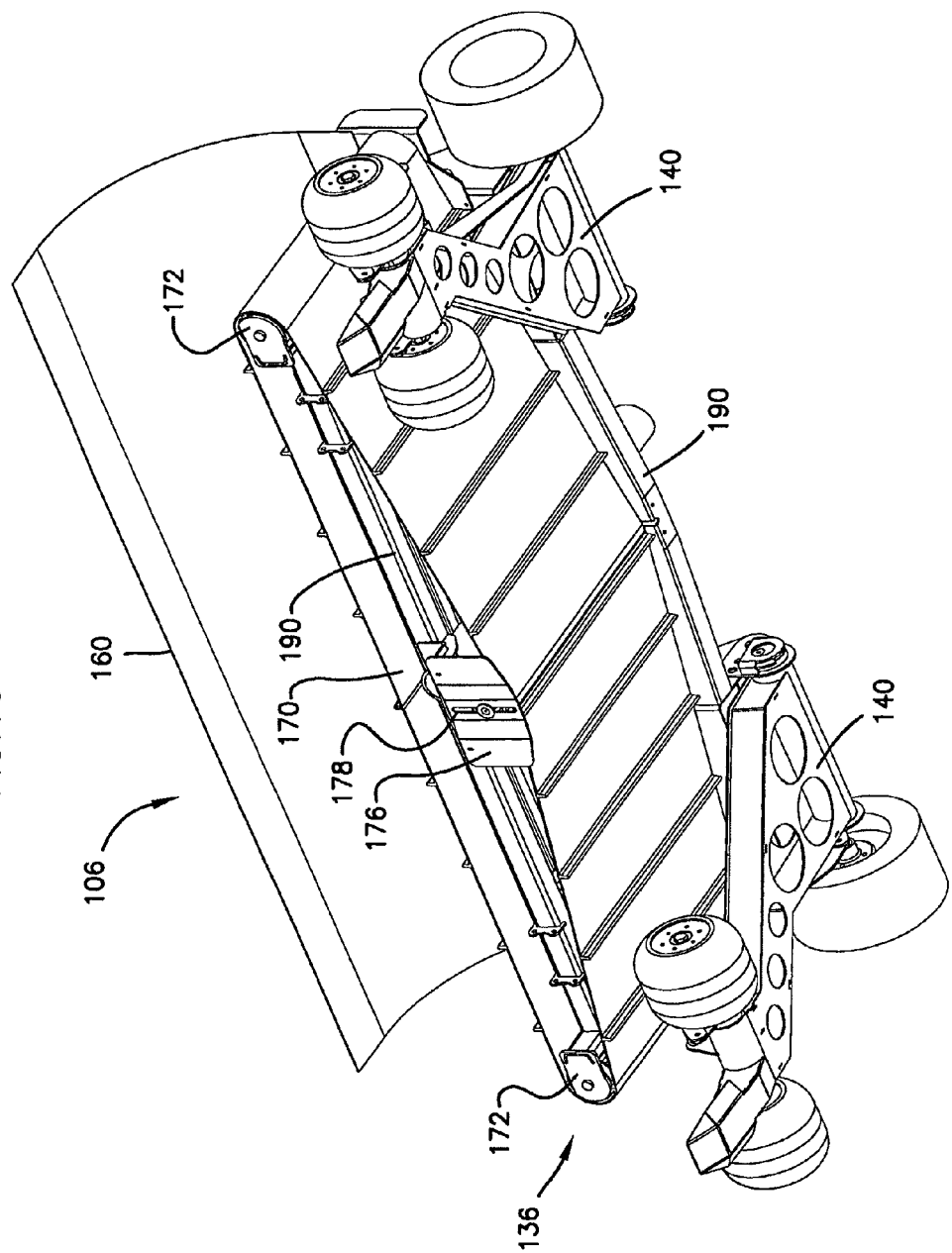
FIG. 16 is a bottom perspective view of a conveyor.

The folding arm 102 is actuated by a linkage 118 to facilitate movement of the pivoting assemblies 104, 106 and 108 between a use position to a storage position. Each pickup and transfer assembly 104, 106 and 108 includes a head unit, designated 124, 126 and 128 respectively. The heads 124, 126 and 128 pick up and deliver the crop rearward to corresponding conveyors 134, 136 and 138. As shown in FIGS. 4, 15 and 16, each pickup and transfer assembly 104, 106 and 108 includes an arcing shroud 160. The shrouds 160 intercept material that has been thrown rearward and directs it downward onto the corresponding conveyor. The shrouds 160 are shown removed for clarity in several of the views, but is foreseen that the shrouds 160 will be utilized in most merging operations.

The merger 100 has flexibility with respect to conveyor travel direction as well as with respect to the number of heads operating, so that multiple configurations for different merging needs and operation are possible. As shown in FIGS. 1-4, the merger 100 may be operated with all three pickup and transfer assemblies, 104, 106 and 108 in a lowered operating position. When operated in this mode, the merger 100 can cover a much wider swath, merging more material and a greater number of windrows than is possible with prior merger devices.

Figure 8:
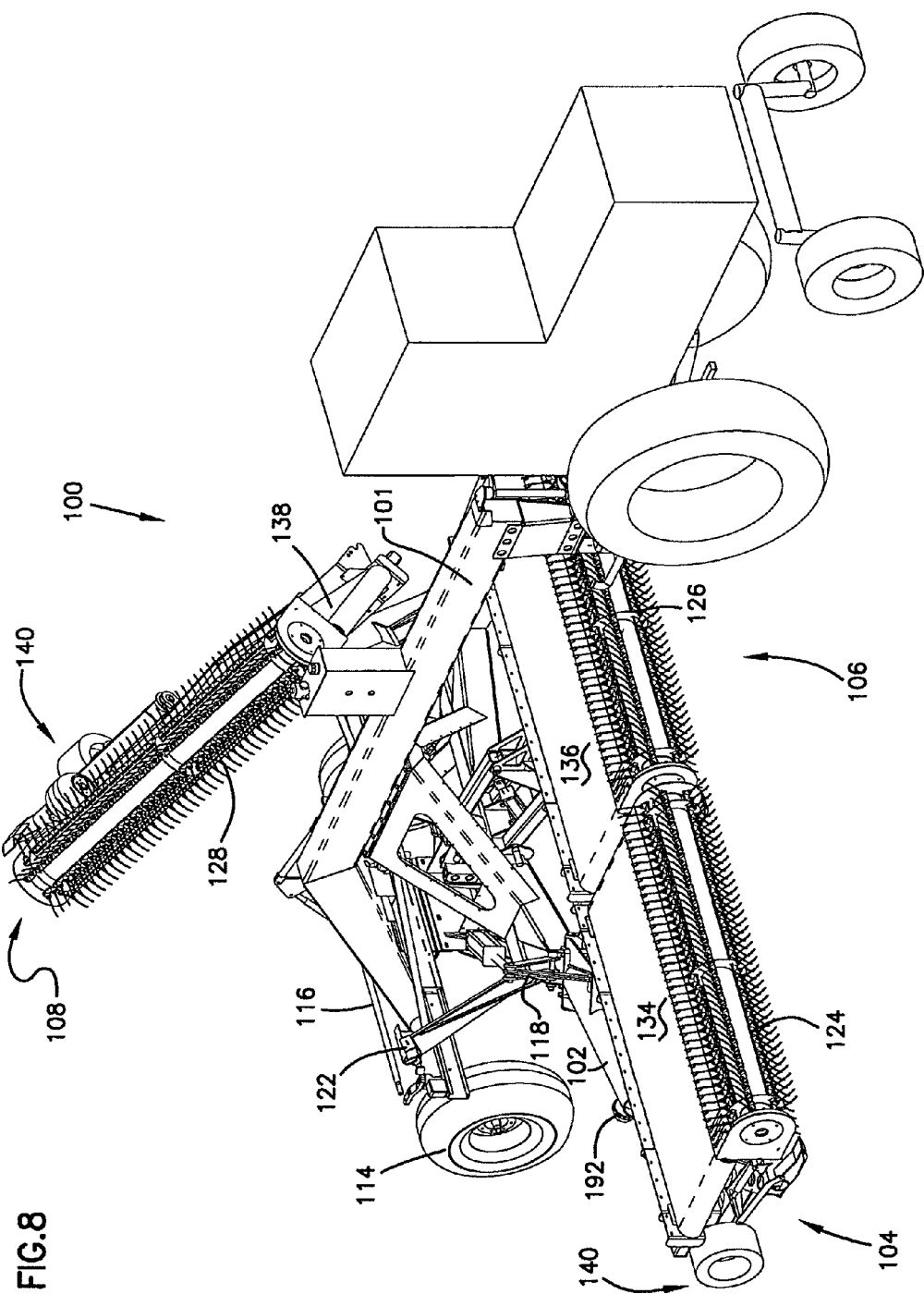
FIG. 8 is a front perspective view of the merger shown in FIG. 1 with one head at a folded position.
Figure 9:
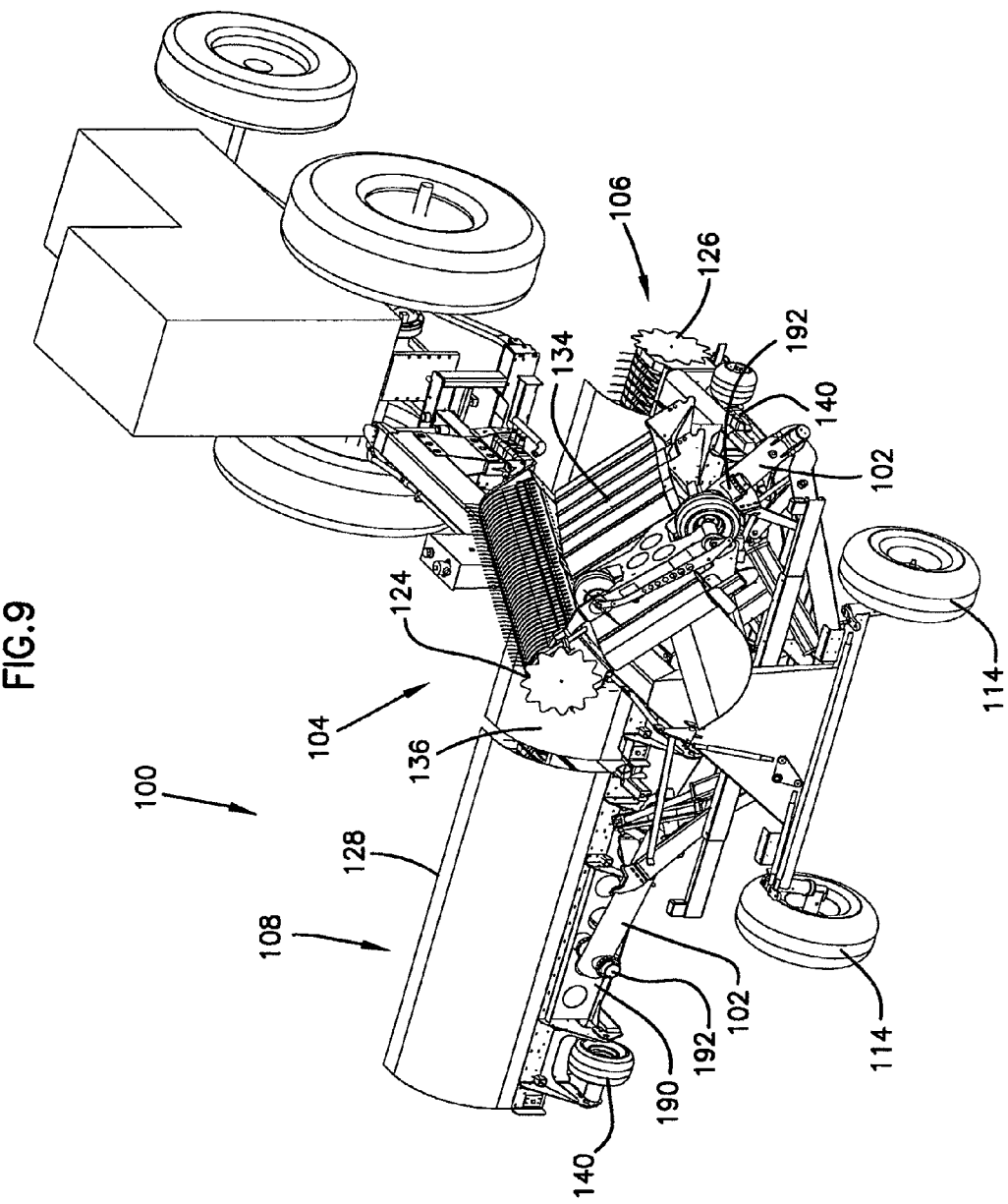
FIG. 9 is a rear perspective view of the merger shown in FIG. 8 with one head at a folded position.

As shown in FIGS. 8 and 9, either of the outer pickup assemblies, namely pickup assembly 104 or pickup assembly 108, may be raised independently of each of the other assemblies. With such a configuration, the merger 100 is able to operate with two of the pickup and transfer assemblies, therefore merging a swath two thirds of the full width of the merger 100, such as when configured as shown in FIGS. 1-4. Such a two head merging configuration may be needed for irregularities in the terrain, to access smaller fields or irregular shaped fields, or for improved merging at edges of fields.

As also shown in FIGS. 8 and 9, either the assembly 104 or the assembly 108 may be raised independently of the other assemblies. This provides for merging while having either of the pickup and transfer assemblies 104 or 108 extending to one side or the other of the towing vehicle 1000. In addition, the conveyors 134, 136 and 138 are reversible, to be operable in both directions so that material may be selectively transported either to the left or the right. The conveyors 134, 136 and 138 may also operate in either direction when one of the pickup and transport assemblies is raised. With such flexibility, it is possible to direct material to the outer ends of the pickup and transport assemblies 104 or 108 or to either of the ends of transport assembly 106, depending on the configuration of the merger 100 and the needs of the merging apparatus.

Figure 5:
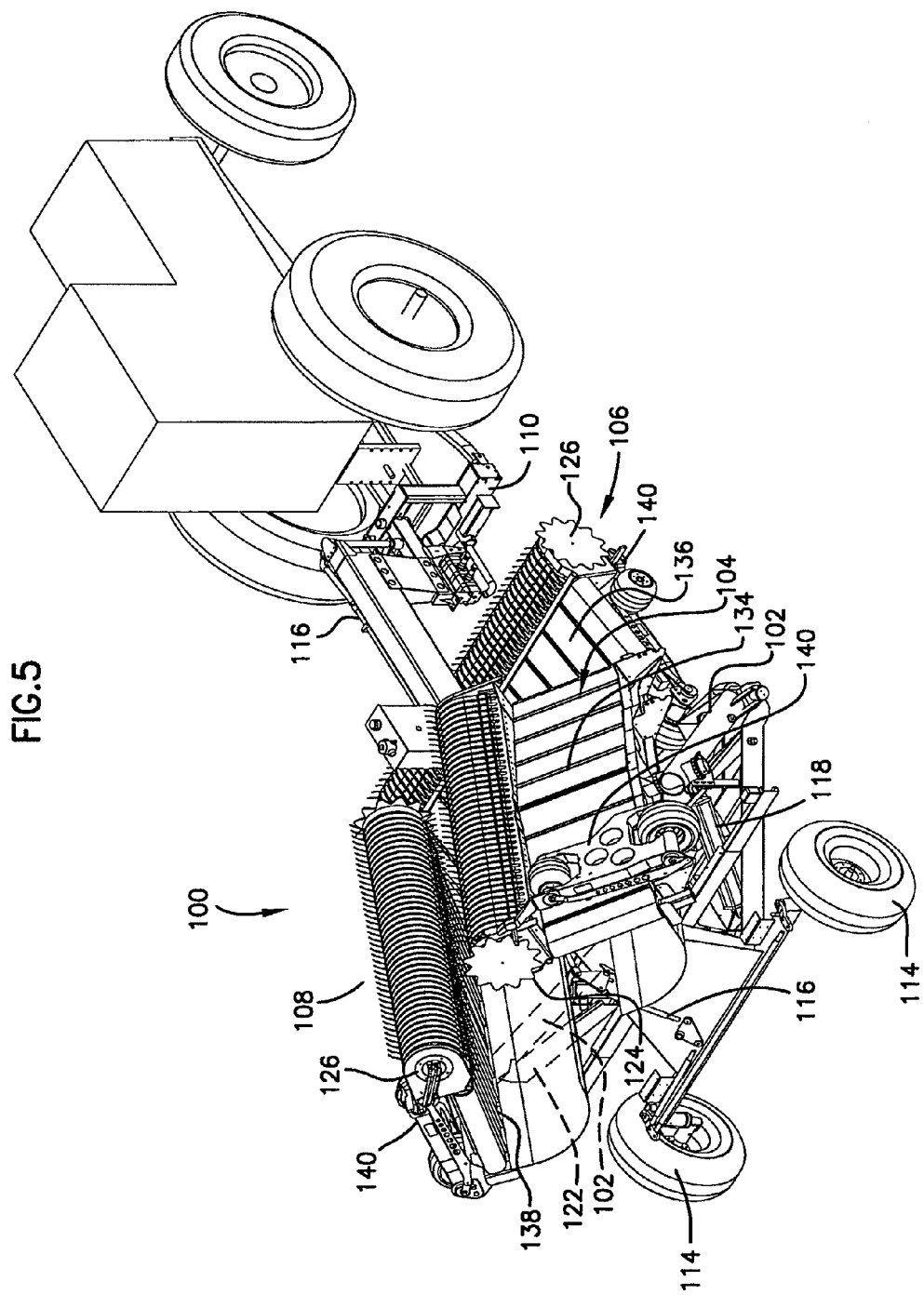
FIG. 5 is a perspective view of the merger shown in FIG. 1 with two heads at a folded position.
Figure 6:
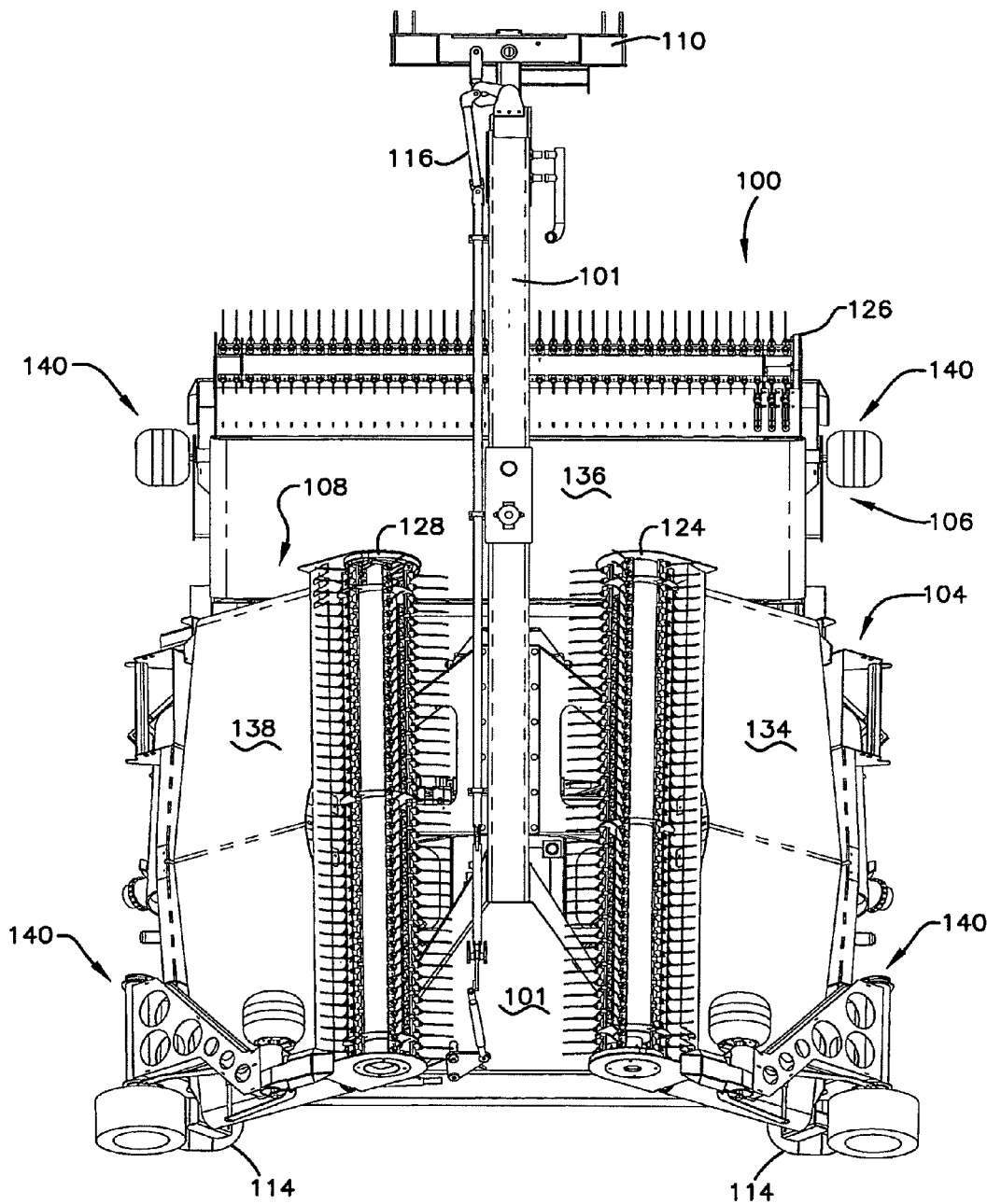
FIG. 6 is a top plan view of the merger shown in FIG. 5 with the two outer heads at the folded position.
Figure 7:
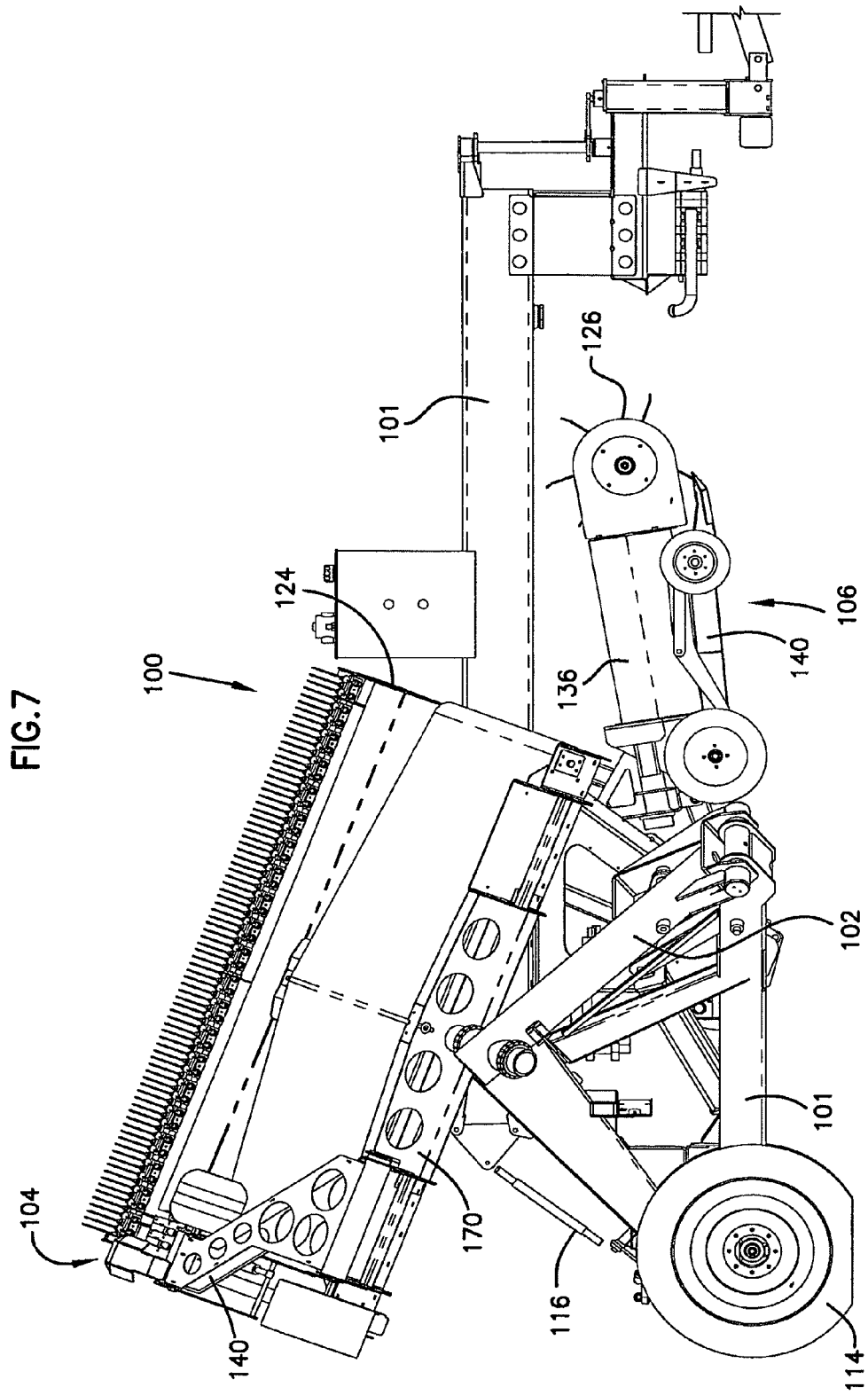
FIG. 7 is a side elevational view of the merger shown in FIG. 5 with the two outer heads at the folded position and the center head raised.

Referring now to FIGS. 5-7, the merger 100 may have both pickup assemblies 104 and 108 raised simultaneously while the center pickup and transfer assembly 106 remains lowered in an operating position. The pickup assemblies 104 and 108 generally rest on supports 122 while raised and folded. The pickup assembly 106 may be operated as a single conveyor merger with its head 126 collecting material and throwing it backward to the associated conveyor 136 for transport to either end of the pickup assembly 106. With this configuration, even smaller areas may be accessed with a merger capable of collecting material from much greater area per pass than is possible with prior art merger devices. In addition, as shown in FIG. 7, all of the pickup and transfer assemblies 104, 106 and 108 may be raised for transporting the merger when not operating to collect material. In this configuration, with all three pickup and transfer assemblies 104, 106, and 108 are raised, the merger 100 is capable of transport on public roads. The pickup and transfer assemblies 104 and 108 fold rearward and inward to minimize the overall width and height of the merger 100. The merger 100 has the additional advantage of being centered behind the transport vehicle in its transport configuration. As the conveyors and folding linkages are independently operable, the merger 100 may be operated continuously, even while the pickup and transfer assemblies 104, 106 and 108 are being raised or lowered. This control provides for continuous operation and improved efficiency that is not possible with prior merger devices that require that the merger be stopped to raise, lower or otherwise adjust any of the merger's equipment.

The pickup and transport assemblies 104 and 108 mount to the folding arm 102 on mounts 192 attached to a pickup and transport assembly support frame 190 associated with each assembly 104 or 108. Each of the pickup and transfer assemblies 104, 106 and 108 is interchangeable with the other pickup and transfer assemblies and vary only in their mounting to the merger 100. This interchangeability reduces the parts inventory necessary for servicing the merger device 100 and decreases down time when repair of one of the pickup assemblies is required.

Merger Heads

Figure 13:
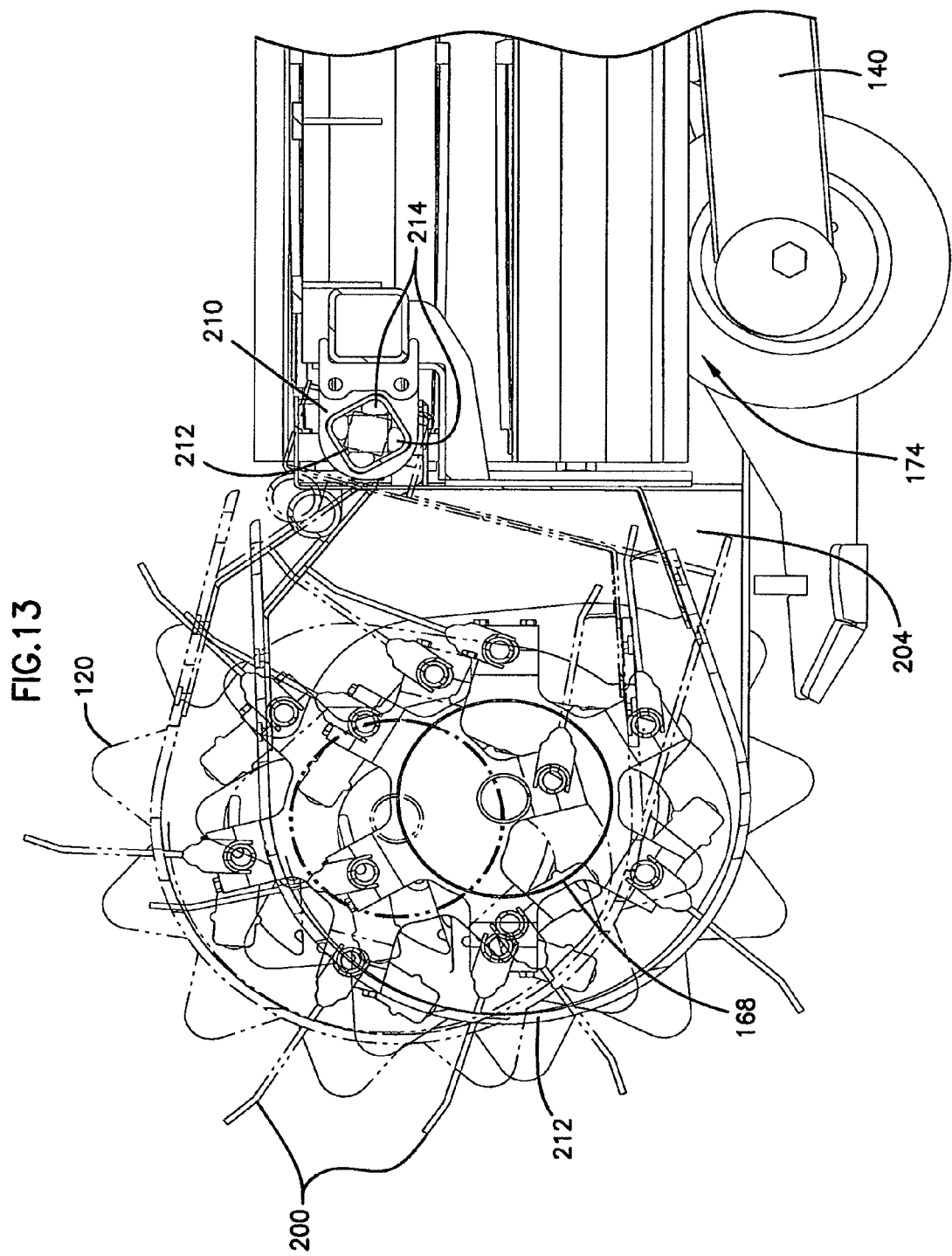
FIG. 13 is an elevational of a pretorque device showing a head angled from the pretorque and at a non-torqued position in phantom.
Figure 14:
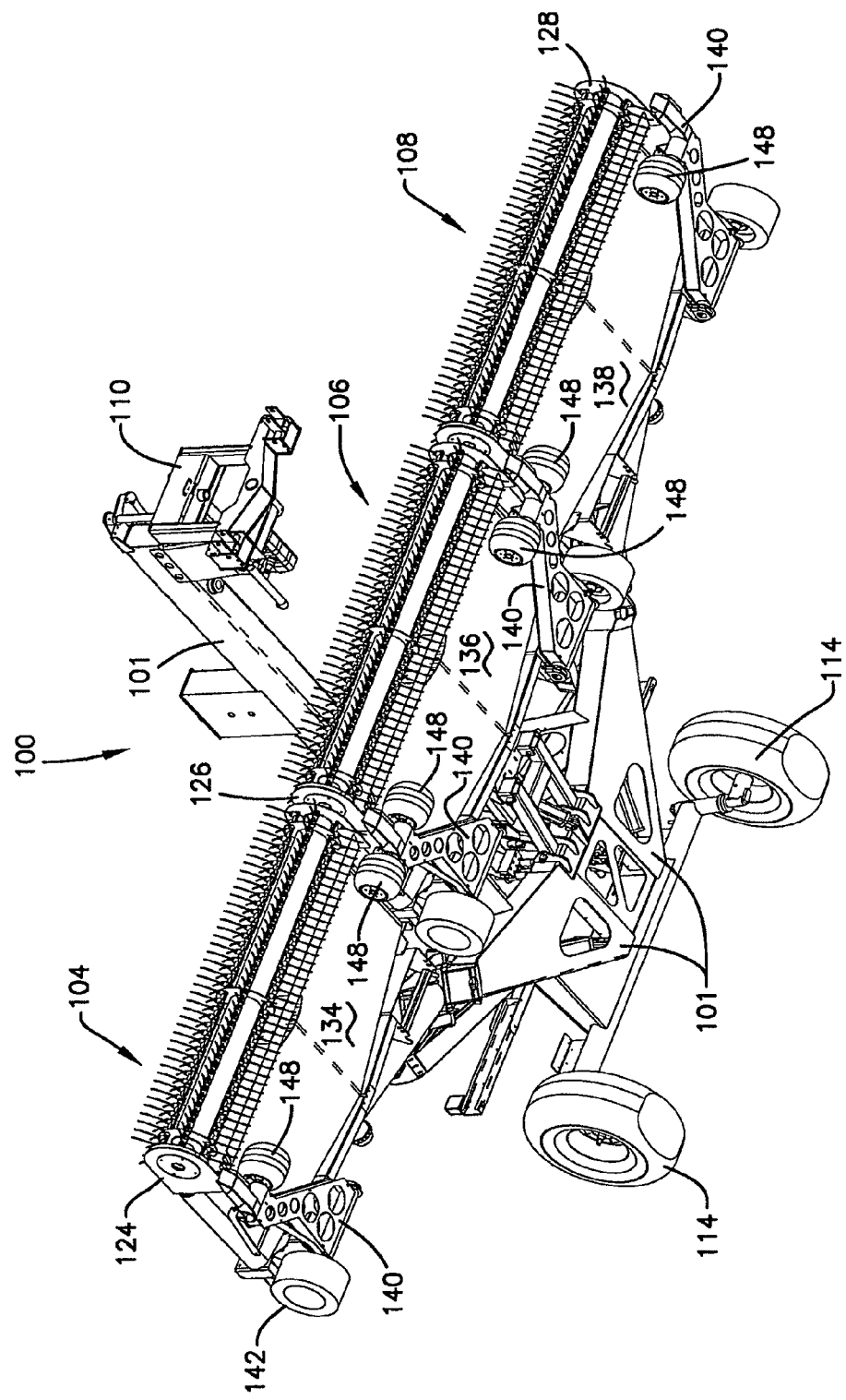
FIG. 14 is a bottom perspective view of the merger shown in FIG. 1.
Figure 17:
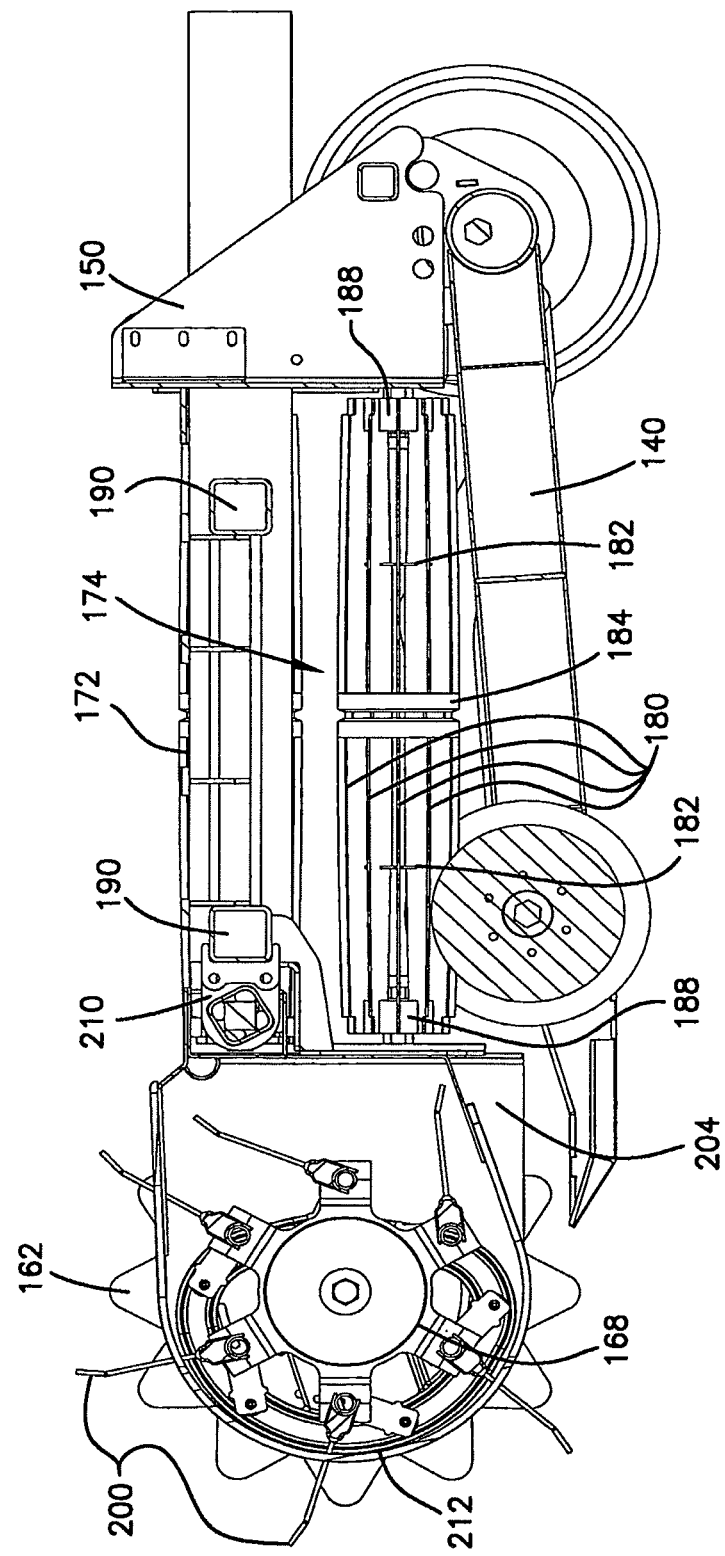
FIG. 17 is an end sectional view of a pickup and transport assembly.
Figure 19:
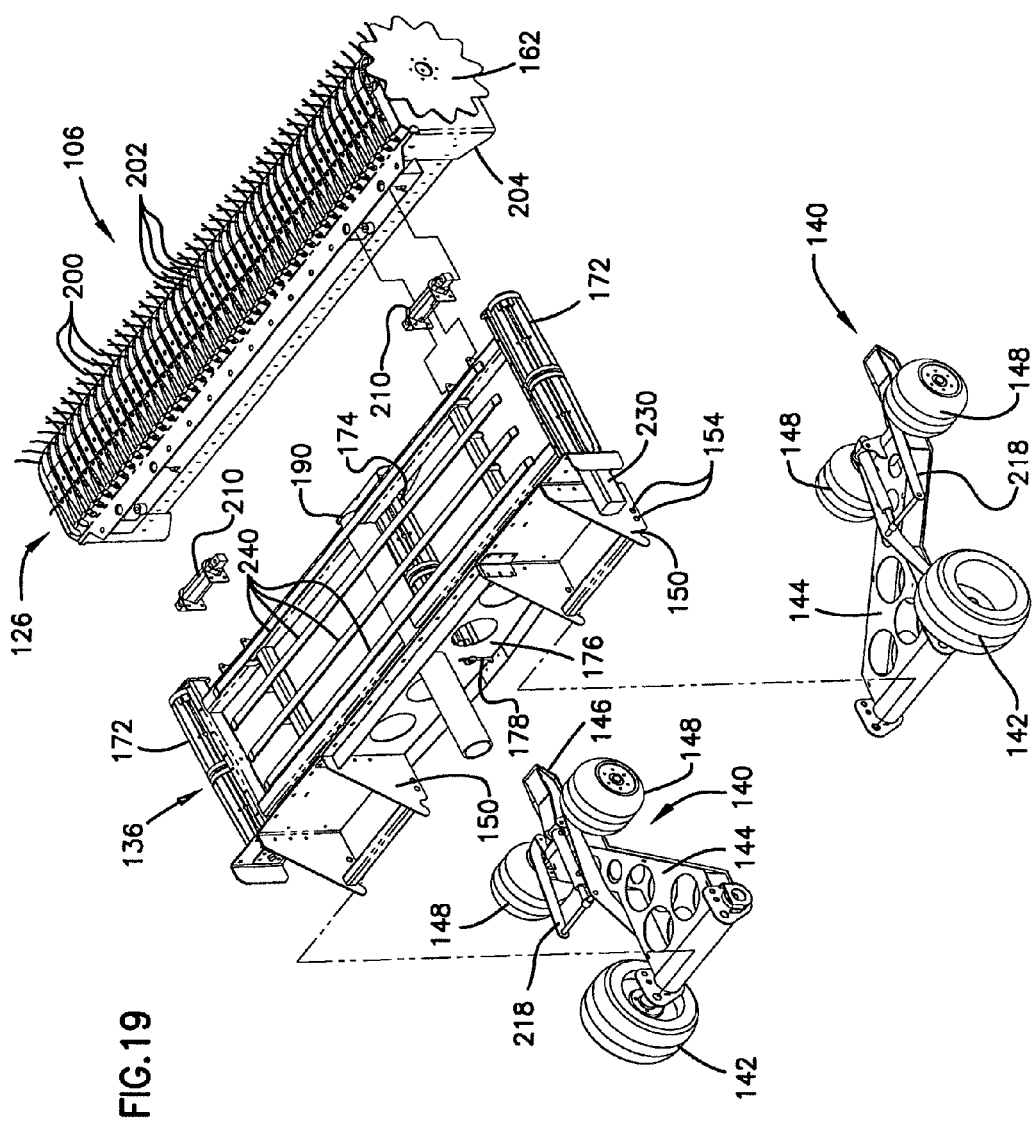
FIG. 19 is a partially exploded perspective view of a pickup and transport assembly for the merger apparatus.

Referring now to FIGS. 14, 15 and 17, the merger heads 124, 126 and 128 include a multiplicity of tines 200 spaced along the length of each head. In addition, as shown most clearly in FIG. 17, the tines 200 are also spaced radially around the circumference of an arbor 168 along the length of the head. The tines 200 are somewhat flexible and are pivotally mounted to provide flexure should a tine engage the ground or other obstacle. Intermediate the sets of tines 200 are guards 202 that extend around the top front and bottom of the arbor 168 and provide protection to the inner equipment of the heads. The guards 202 are straight members in a preferred embodiment that are bent and mounted under tension, as explained in co-pending U.S. patent application Ser. No. 10/027,930, incorporated herein by reference. The tines 200 and guards 202 are easily removable and replaced should damage occur. The guards 202 may be loosened at one end while remaining attached at a second end to provide easy access to damaged tines 200 and perform other maintenance. The heads include a housing 204 that is mounted to the corresponding pickup and transfer assembly on the preloaded torque assemblies 210 as shown in FIG. 19. The preloaded torque assemblies 210 provide a lifting force against the weight of the heads 124, 126 and 128 to improve the ride as the merger 100 travels over irregularities in the terrain. As shown most clearly in FIG. 17, the heads 124, 126 and 128 are mounted with approximately 15 degrees of bias from the preloaded torque assembly in variance to a non-torqued position, shown in phantom in FIG. 13. The heads are therefore spring loaded and rise up and over rocks and other irregularities with greater ease. In addition to improving the ability to "ride" over irregularities, the preloading force improves performance by increasing contact time with material to be picked up. The flexure also decreases the damage and therefore, maintenance and down time for the merger.

Figure 18:
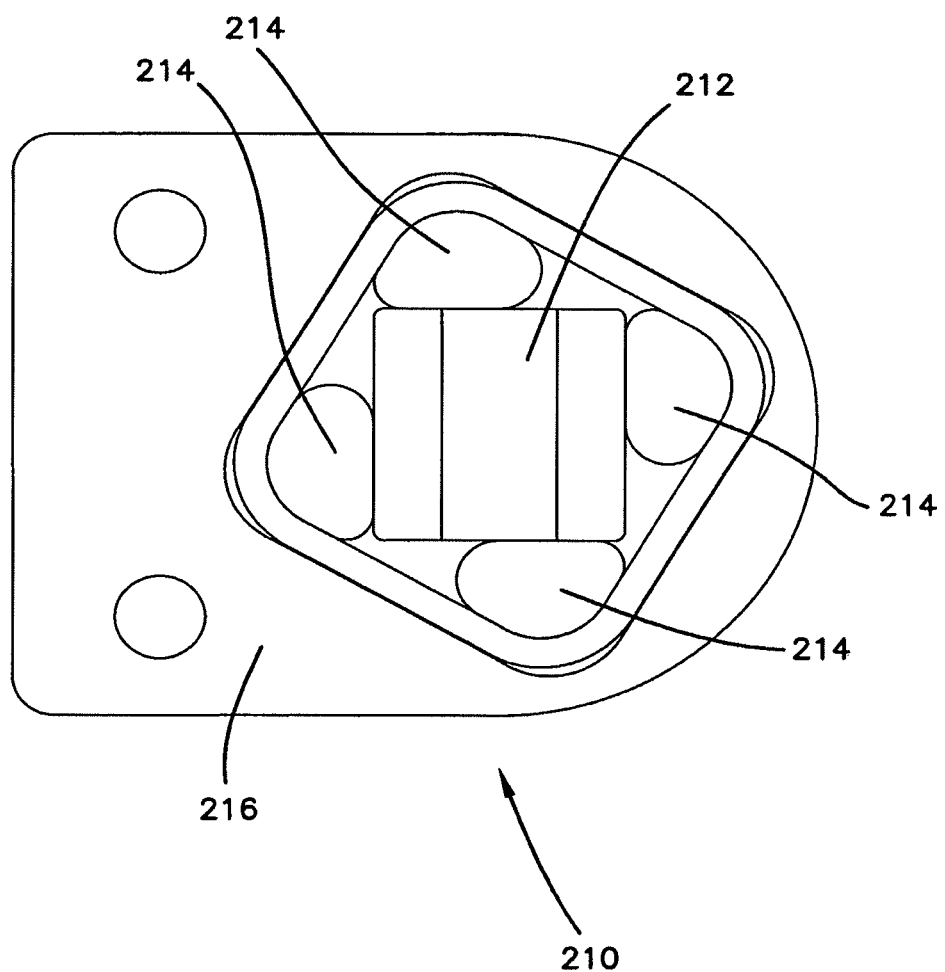
FIG. 18 is an end elevational view of the pre-torque device for the head of the merger.

Referring now to FIG. 18, the preloaded torque assembly 210 includes a center rectangular floating element 212 that is supported by four resilient members 214 spaced on the four sides of the center floating element 212. A housing 216 retains the center member 212 and the resilient support members 214 and allows for mounting of the heads to the preloaded torque assembly 210.

Figure 10:
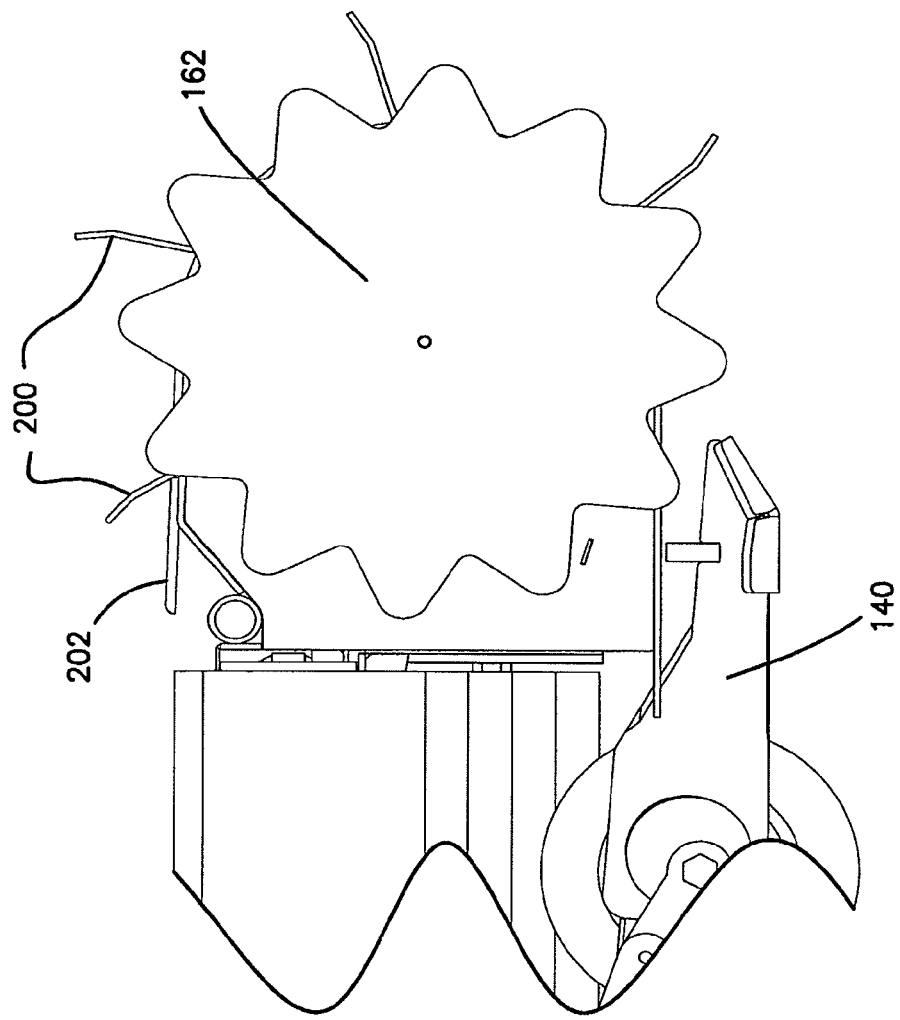
FIG. 10 is a side elevational view of a star wheel device for the merger apparatus shown in FIG. 1.

As shown most clearly in FIG. 15, a hydraulic motor 206 drives each arbor 168 for the heads 124, 126 and 128. The hydraulic motor 206 is recessed into the housing 204 of the heads 124, 126 and 128. With the hydraulic motor 206 recessed, the ends of the heads 124, 126 and 128 are positioned substantially to abut one another. No obstruction due to drive mechanisms, support wheels or other mechanisms inserted intermediate the adjacent heads is required, as was typical with previous merger devices. Therefore, the end tines 202 of one head are close to the tines 202 of another head so that there are no large gaps between the heads as occur with previous merger devices, which had motors and other equipment between heads. In addition, the merger includes star wheels 162 mounted intermediate ends of the heads 124 and 126 and intermediate ends of the heads 126 and 128. The star wheels 162 are rotatably mounted to the housing 204 at the ends of the heads, as shown most clearly in FIG. 19. As shown in FIG. 10, the star wheels 162 include a number of teeth spaced around the periphery of the star wheel 162 in a notched configuration. As the star wheels 162 rotate, the notches and teeth intercept material that is not picked by the end tines 202 of the adjacent heads and aids in directing the material rearward. The star wheels 162 eliminate gaps and minimize the material that is not picked up and left on the ground after the merger 100 passes.

The heads 124, 126 and 128 of the present invention provide an unobstructed pickup face to engage the material to be windrowed as the merger 100 moves. Recessed hydraulic motors 206 allow for placing the ends of the heads 124, 126 and 128 in close proximity to one another and eliminate the large gaps where prior art drive support mergers and other mechanisms and machinery were located. Moreover, the star wheels 162 inserted intermediate the ends of heads 124, 126 and intermediate the ends of the heads 126 and 128, as shown most clearly in FIG. 4, ensure that the face of the merger is unobstructed and continuous. The merger 100 provides improved pickup while achieving a greater width per pass than has been seen heretofore.

Folding

A folding linkage 118 that is hydraulically driven accomplishes the folding of the pickup and transfer assemblies 104, 106 and 108. The outer pickup and transfer assemblies 104 and 108 are folded rearward and inward from the use position shown in FIG. 1, to the storage position shown in FIG. 5. The pickup and transport assemblies 104 and 108 are directed up, in and to the rear at the folded position shown in FIG. 5. The arms 102 of the folding frame 101 engage and rest on supports 122 at their folded position. Folding of each of the assemblies 104, 106 and 108 can occur independently from folding of the other assemblies and can occur while the merger 100 is in operation and moving. The pickup and transfer assemblies 104, 106 and 108 are substantially compact and are interchangeable so that a spare head may be utilized and mounted to either of the folding linkages 118 or mounted as the center head 106.

Material Transport System

Each of the pickup and transport assemblies 104, 106 and 108 includes an associated conveyor assembly, 134, 136 and 138 respectively, such as shown in FIGS. 1, 4, 5 and 14. Although not shown in several of the views, the conveyor assemblies include shrouds 160 as shown in FIG. 15. The shrouds 160 are generally positioned behind the rear edge of the conveyor and extend upward and forward in an arcing configuration over the conveyors to direct material thrown rearward by the heads down onto the moving conveyor. This configuration ensures that a greater percentage of the material is actually transferred and merged.

Figure 20:
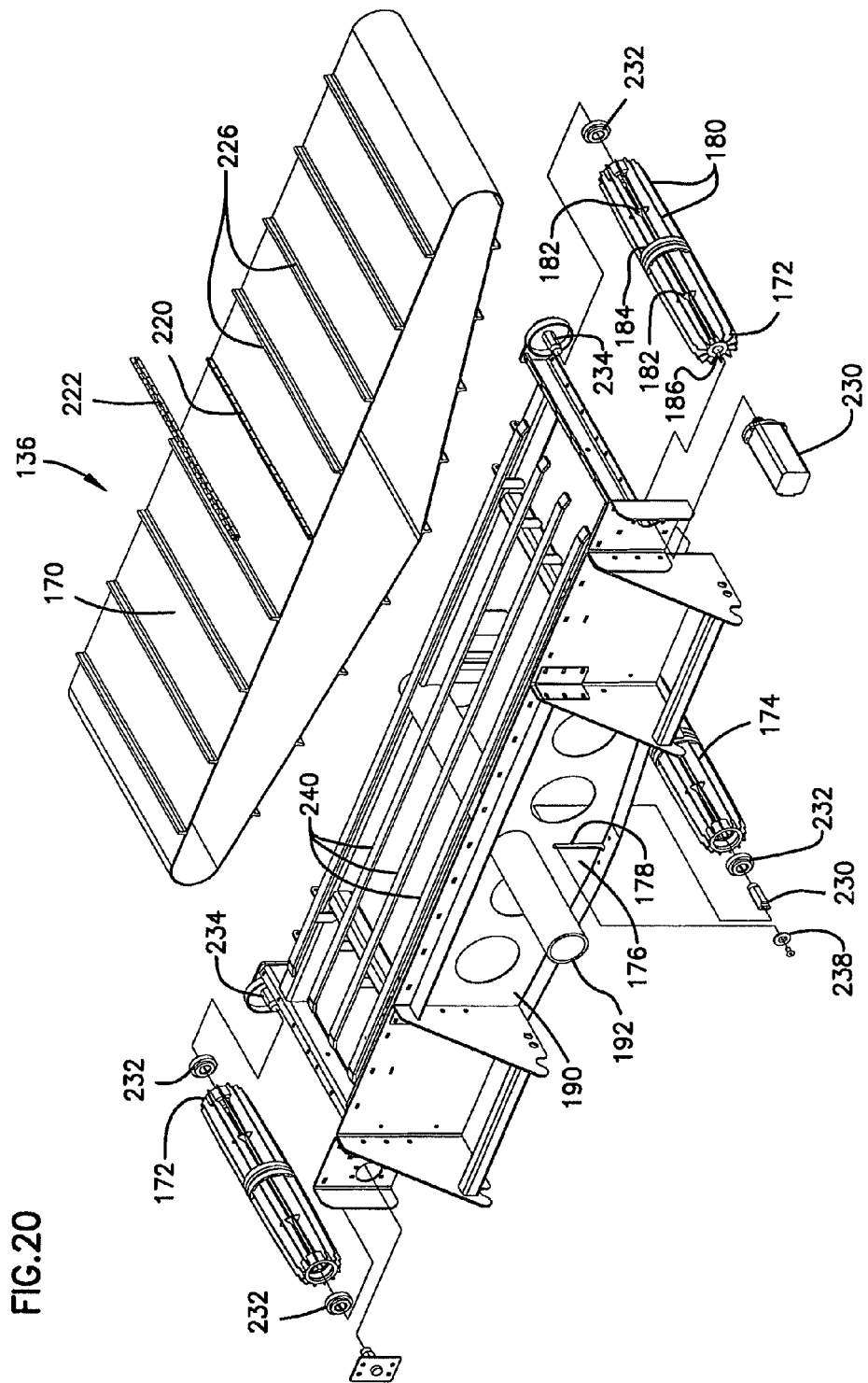
FIG. 20 is a perspective partially exploded view of a conveyor for the merger apparatus.

Referring to FIGS. 16, 19 and 20, each of the conveyors 134, 136 and 138 includes a belt 170 mounted above end pulleys (also commonly called rollers) 172. The upper length of the belt 170 travels on horizontal supports 240 extending along the length of the belt. A tensioner pulley 174 is positioned below and intermediate the end pulleys and mounts in a slot 178 in a tensioner plate 176. The slot 178 extends vertically so that the weight of the tensioner pulley 174 aids in providing proper tension to the conveyor belt 170.

Figure 11:
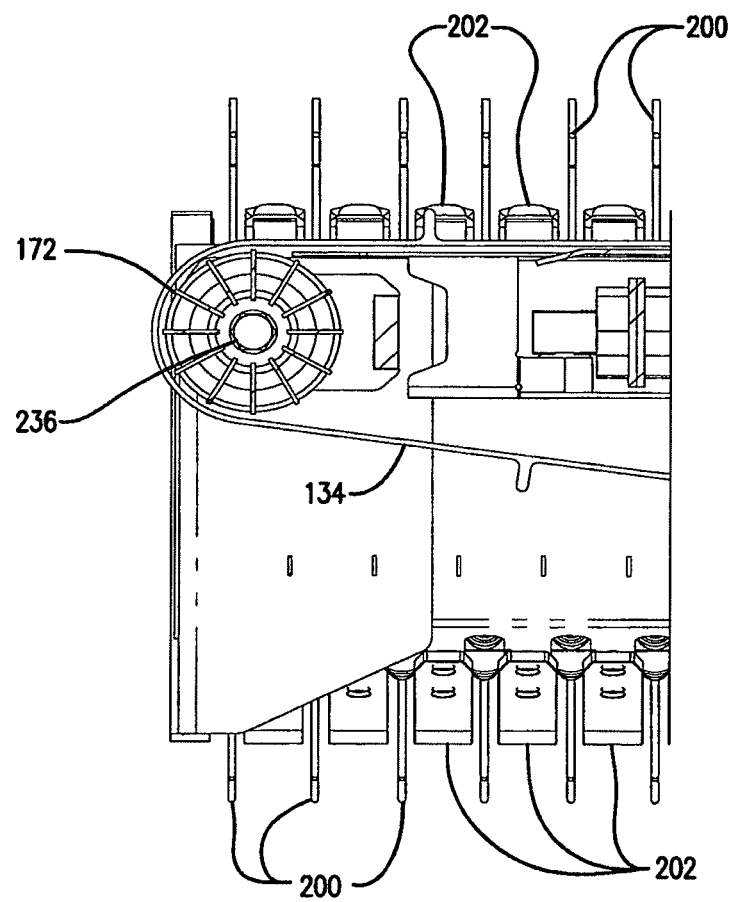
FIG. 11 shows an end sectional view of a hexagonal shaft construction utilized in the conveyor of the merger apparatus.
Figure 21:
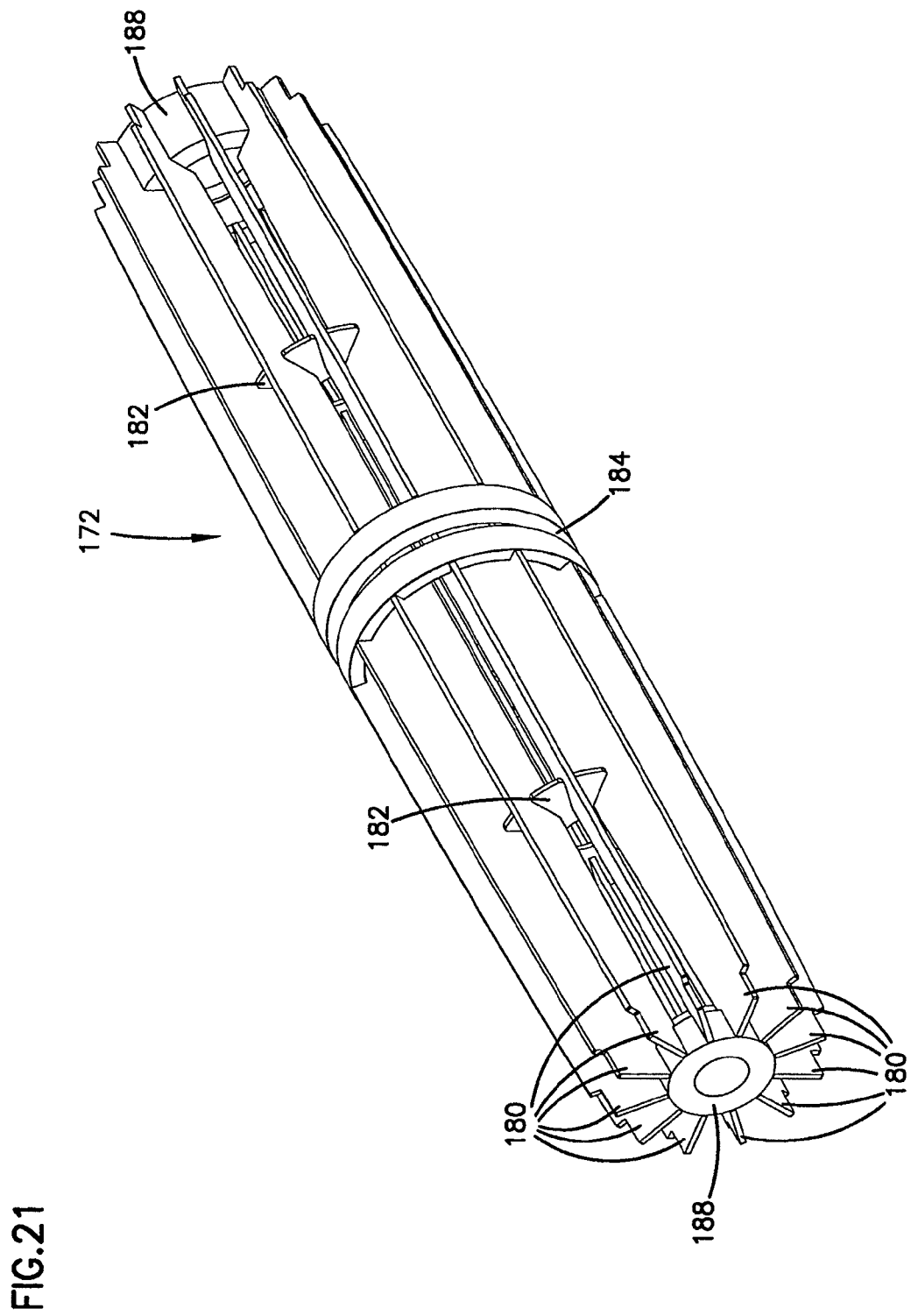
FIG. 21 is a perspective view of a conveyor roller.

Each of the pulleys 172 and 174 is uniquely configured to eliminate a center axle and its associated problems. The pulleys 172 and 174 are similar with the only differences occurring in the manner they are mounted and driven. The rollers 172 and 174 include a plurality of blades 180 spaced about a periphery of bulkheads 182 and center V-rings 184. In the embodiment shown, twelve of such blades 180 are utilized, but other configurations with fewer or more blades could also be utilized. The bulkheads 182 include radially extending slots, as shown in FIG. 21 to position and hold the blades 180. The V-rings also provide for engaging a tracking member from the belt 170 in some configurations to ensure that the belt does not drift laterally and remains properly aligned. The blades 180 preferably include a shallow arcing profile so that a slight crown is provided to the belt 170. With the multiple blades 180 and with elimination of a center axle, material that otherwise may fall into the roller area may be chopped up by the blades 180. In addition, material is less likely to stick, jam or bind axles, as is a common problem with conveyor pulleys. The pulleys 172 and 174 include a bearing housing 188 at one or both ends. In addition, at least one of the rollers includes a drive socket for receiving a drive shaft from a hydraulic conveyor motor 230 as shown in FIG. 20. The bearing housings 188 receive bearings 232 that connect over mounts 234. As shown in FIG. 11, the merger 100 utilizes hex pins 236 throughout its construction that engage an inner hex shaped surface of the bearings 232 and provides for simpler assembly and maintenance, due to improved tool access and engagement. Tension on the belt 170 is applied by connecting the ends at a seam 220 and tightening. The seam 220 defines a flange, as the belt 170 typically includes a plurality of flanges extending transverse to the length of the belt to aid in moving material. The seam 220 includes a hinge 222 that receives a pin and is folded over for tightening. The ends of the belt 170 are then bolted together or otherwise connected to provide proper tension on the belt.

With the present configuration of the conveyors, the ends are fixed rather than sliding. This keeps the pulleys 172 at a fixed mounting location and provides advantages in alignment and reconfiguration. With fixed ends, no adjustment is made as the pickup and transport assemblies 104, 106 and 108 are folded or unfolded. Since there is no spacing needed for adjustment, overall width is decreased and ends of the conveyors are maintained in a closer proximity. Moreover, it has been found that with the motors for the heads recessed, the ends of the conveyors 134, 136 and 138 are sufficiently close so that at operating speed, material does not fall between the ends of the belts and is propelled forward with sufficient momentum to reach the belt 170 of the next adjacent conveyor.

The tension is also critical as the hydraulic conveyor motors 230 are reversible so that the conveyors 134, 136 and 138 may be operated to direct material for merging to either end of the merger 100. In addition, the conveyors 134, 136 and 138 are operable independent of one another to provide greater flexibility with merging material than is possible with the prior art. Tensioning becomes more critical as the belt 170 is pulled when the belt travels in a first direction, but is pushed when the belt 170 travels in a second direction. If the belt 170 is not in a proper tension and does not have proper tracking devices, the conveyors may jam or otherwise malfunction. The present invention provides sufficient tracking, drive and alignment that such problems are overcome.

Controls

Figure 12:
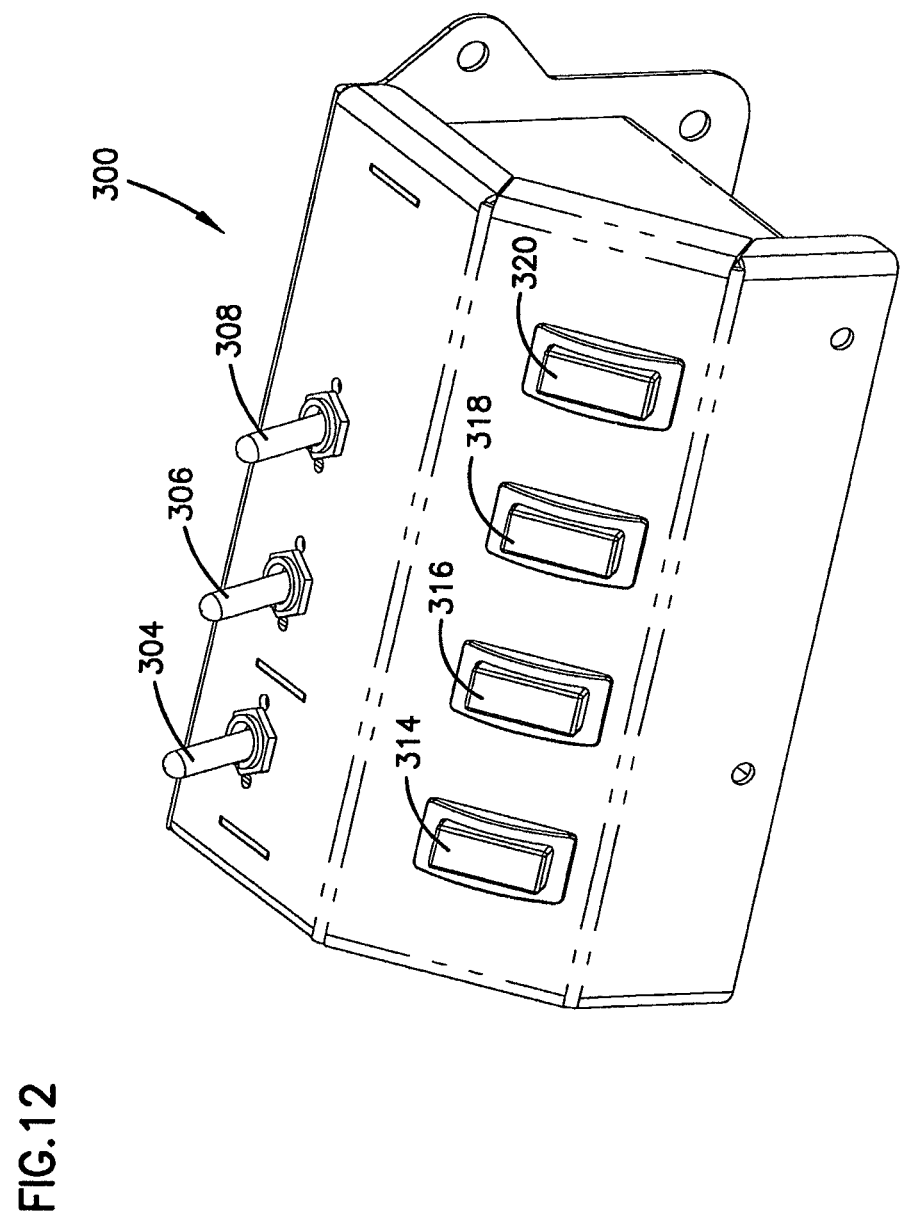
FIG. 12 shows a schematic view of the control system for the merger apparatus shown in FIG. 1.

Referring now to FIG. 12 there is shown the controls 300 for the merger 100. The controls 300 are remotely actuated from the cab of the tractor 1000 in a preferred embodiment, but may also be utilized in the cab of self propelled embodiments. The control panel 300 includes switches to control the function of the merger 100. Three position toggles switches 304, 306 and 308 control the conveyor belt direction for the pickup and transfer assemblies 104, 106 and 108, respectively. The switch 304 controls the left conveyor and pickup and transfer assembly 104. The switch 304 controls the center conveyor 134 and the head 124. The switch 306 controls the center conveyor 136 and the head 126. The switch 308 controls the center conveyor 138 and the head 128. In one position, the conveyors travel to the left and in another position, the conveyors travel to the right. With the switches 304, 306 or 308 in the middle position, the associated conveyor and pick up head are turned off.

The control panel also includes switches 314, 316 and 318 to control raising and lowering of the pickup and transfer assemblies 104, 106 and 108, respectively. In a preferred embodiment, the switches 314, 316 and 318 are rocker type switches. The switches 314, 316 and 318 allow for clearing obstructions and positioning the pickup and transfer assemblies 104, 106 and 108 for road travel. A switch 320 allows for height adjustment of the heads 124, 126 and 128. The controls 300 are easily accessible by an operator and provide for adjustment while moving. The controls 300 include wiring leading to electro-hydraulic valves on the merger 100 in a preferred embodiment. Hydraulic pressure is provided by the hydraulic system of the tractor 1000 for lifting functions. The heads 124, 126 and 128 and the conveyors 134, 136 and 138 are powered by a tractor power take off driven hydraulic pump. The hydraulic system also provides for a floating operation for the heads 124, 126 and 128 when the associated conveyor is running in the normal operating condition.

Supports

Referring now to FIGS. 16 and 19, skid assemblies 140 provide support and height adjustment for the pickup and transport assemblies 104, 106 and 108. The skid assemblies 140 include a rear wheel 142 and one or more front rollers 148 mounted on a skid body 144. A ski type member 146 may extend forward with a lower ramped lead surface to provide for more easily traveling over uneven terrain. The skid assemblies 140 include adjustment holes 154 and 152 for adjusting the position of the rollers 148 as well as their mounting position on the pickup and transfer assemblies 104, 106 and 108. A linkage 218 is utilized for adjusting the position of the skid assembly 140 and therefore the height of the associated support head. The skid assemblies 140 are positioned below the conveyors 134, 136 and 138 to the rear of the heads 124, 126 and 128, as also shown in FIG. 17. The positioning of the skid assemblies 140 eliminates impinging on the operation of the heads and provides for achieving an unobstructed face for the pickup heads 124, 126 and 128.

Merging Operations

Figure 22:
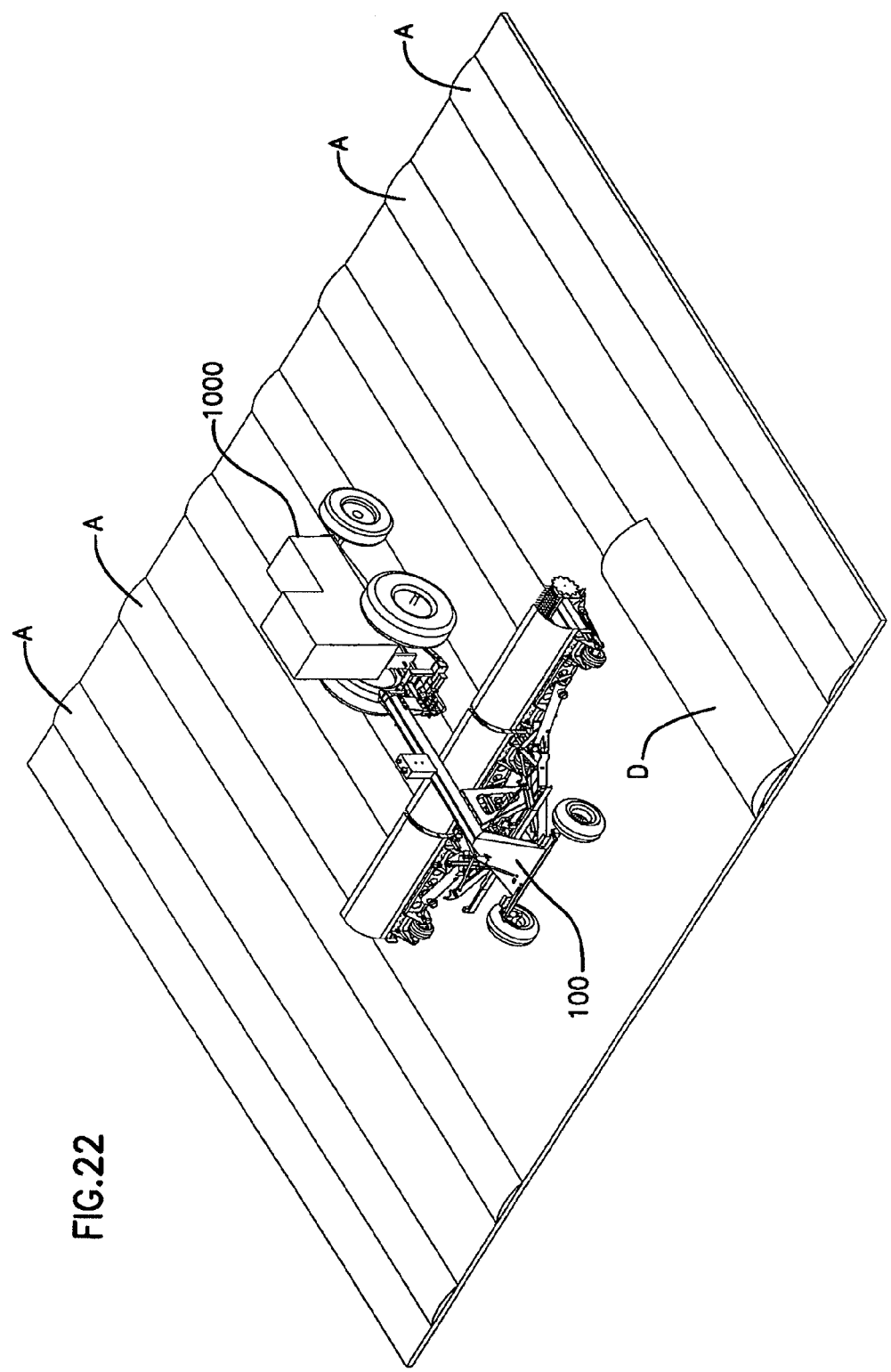
Figure 23:
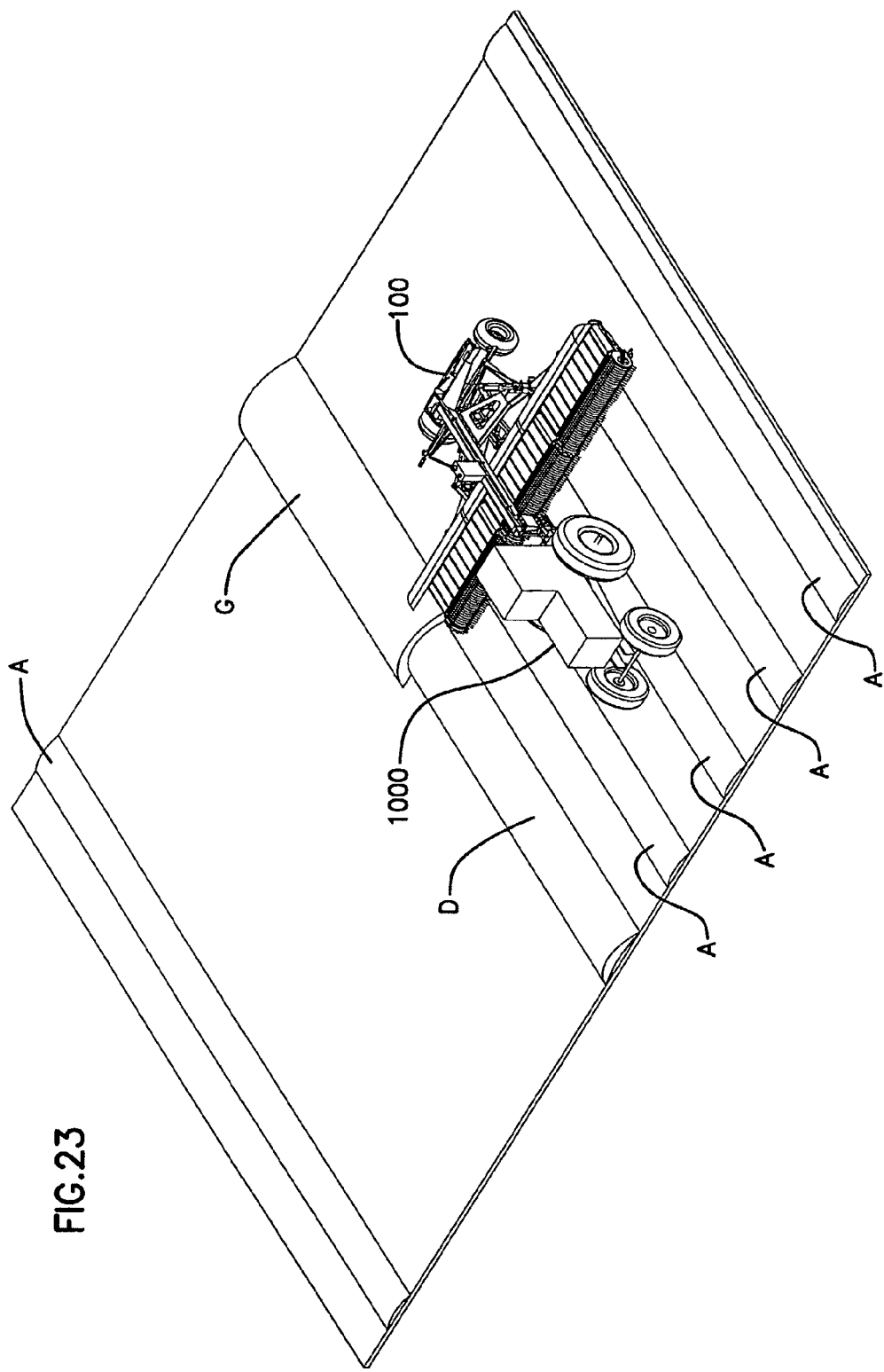

Referring to FIGS. 22-24, the merger apparatus 100 may be configured for varying the merging patterns. As shown in FIG. 23, the conveyors can be operated with two conveyors driven in a first direction and a third conveyor driven in the opposite direction. FIG. 23 shows the merger 100 configured for a typical merging operation with all conveyors operating in the same direction. It can be appreciated that the merger 100 may also be operated with only two heads or one head. Such merging patterns are shown in U.S. Pat. No. 6,205,757 to Dow.

As shown in FIG. 24, the merger may create a double windrow B by transferring a single windrow onto another single windrow A. This is accomplished with a single pickup and transfer assembly operating in a first direction. Triple windrows C are created with two pickup and transfer assemblies operating in the same direction to merge two windrows onto a single windrow A. As shown in FIG. 22, quadruple windrows D are created when three windrows are transferred onto a single windrow A.

As shown in FIG. 23, the merger 100 may be operated with all three pickup and transfer assemblies operating in the same direction. With such a configuration, three windrows may be merged from each side of a single windrow A. Six windrows may be merged to create a septuple windrow G as the merger 100 is advanced up and down the windrows.

It can be appreciated that the merger 100 of the present invention provides for changing the number of pickup and transfer assemblies operating and the direction of the conveyors to combine windrows into larger merged windrows. Any combination of from one to seven windrows may be achieved by the merger 100 to meet the capabilities of the harvesting equipment and account for the field and weather conditions.

These features of novelty and various other advantages that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

We claim:

1. A windrow merger apparatus configured for travel in a first direction, comprising:
   a frame;
   a first pickup assembly supported by the frame, the first pickup assembly including a first pickup head configured to pick up and transfer material to an associated first belt conveyor arranged to convey material in a direction transverse to the first direction of travel and driven by a first motor;
   a second pickup assembly supported by the frame, the second pickup assembly including a second pickup head configured to pick up and transfer material to an associated second belt conveyor arranged to convey material in a direction transverse to the first direction of travel and driven by a second motor; and
   a third pickup assembly supported by the frame, the third pickup assembly including a third pickup head configured to pick up and transfer material to an associated third belt conveyor arranged to convey material in a direction transverse to the first direction of travel and driven by a third motor;
   wherein at least two of the pickup assemblies are foldable between an extended position and a retracted position, each of the first, second, and third pickup assemblies being aligned side by side when each of the pickup assemblies is positioned in the extended position such that the first, second, and third pickup assemblies provide a laterally aligned unobstructed continuous line of material pickup able to provide transport of all material transferred to the conveyors to either end of the aligned conveyors; and wherein the first pickup assembly and the third pickup assembly are raised in the retracted position.

2. A windrow merger apparatus according to claim 1, wherein the merger is operable with at least one of the pickup assemblies in the retracted position.

3. A windrow merger apparatus according to claim 1, wherein each of the first second and third belt conveyors is independently driven.

4. A windrow merger apparatus according to claim 1, the pickup assemblies being uncoupled from one another in all positions.

5. A windrow merger apparatus according to claim 1, wherein in the retracted position, the first pickup assembly and the third pickup assembly are above the second pickup assembly.

6. A windrow merger apparatus according to claim 1, the merger comprising a hitch aligned along the first direction before the second pickup assembly.

7. A windrow merger apparatus according to claim 1, wherein in the extended position, the first conveyor belt, the second conveyor belt and the third conveyor belt are aligned and operable to transport material from the first pickup assembly, the second pickup assembly and/or the third pickup assembly to either end of the aligned conveyors.

8. A windrow merger, comprising:
a frame;
a merger assembly including a center pick up and transfer assembly including a center pick up head configured to pick up and transfer material to an associated first conveyor having a first conveyor belt, and a first conveyor motor; a left pick up and transfer assembly including a left pick up head configured to pick up and transfer material to an associated second conveyor having a second conveyor belt, and a second conveyor motor; and a right pick up and transfer assembly including a right pick up head configured to pick up and transfer material to an associated third conveyor having a third conveyor belt, and a third conveyor motor; each of the center, left and right pick up heads having a length, the left and right pick up heads each being positionable in an extended position and a retracted position;
wherein the first conveyor, the second conveyor and the third conveyor are aligned side by side with the lengths of the left and right pick up heads being generally transverse to a direction of travel when positioned in the extended position and the first conveyor belt, the second conveyor belt and the third conveyor belt are able to provide transport of all material transferred to the conveyors to either end of the aligned conveyors.

9. A windrow merger according to claim 8, wherein the center pick up head, the left pick up head and the right pick up head are laterally aligned in the extended position and form a laterally aligned unobstructed continuous line of material pickup.

10. A windrow merger apparatus configured for travel in a first direction, comprising:
a frame;
a first pick up assembly supported on the frame including a first pickup head configured to pick up material and transfer the material to an associated first belt conveyor arranged to convey material in a direction transverse to the first direction of travel;
a second pick up assembly supported on the frame including a second pickup head configured to pick up material and transfer the material to an associated second belt conveyor arranged to convey material in a direction transverse to the first direction of travel;
a third pick up assembly supported on the frame including a third pickup head configured to pick up material and transfer the material to an associated third belt conveyor arranged to convey material in a direction transverse to the first direction of travel;
wherein at least two of the pick up assemblies are foldable between an extended position and a retracted position, each of the first, second and third pick up assemblies being aligned side by side when each of the pick up assemblies is positioned in the extended use position such that the first, second and third pick up assemblies provide a continuous line of material pick up and the belt conveyors are configured to provide transport of material from the first pick up assembly, the second pick up assembly and the third pick up assembly to either end of the aligned assemblies.

11. A windrow merger apparatus according to claim 10, wherein the first pickup head, second pickup head and the third pickup head are laterally aligned in the extended use position and form a laterally aligned unobstructed continuous line of material pickup.

* * * * *